(12) United States Patent
Christopher Selvi

(10) Patent No.: US 12,405,724 B2
(45) Date of Patent: Sep. 2, 2025

(54) SYSTEMS AND METHODS FOR A TOUCHSCREEN INTERFACE WITH SPIN WHEEL WIDGET

(71) Applicant: GE Precision Healthcare LLC, Wauwatosa, WI (US)

(72) Inventor: Godwin Christopher Selvi, Karnataka (IN)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 156 days.

(21) Appl. No.: 17/819,505

(22) Filed: Aug. 12, 2022

(65) Prior Publication Data

US 2024/0053884 A1 Feb. 15, 2024

(51) Int. Cl.
G06F 3/04886 (2022.01)
G06F 3/04845 (2022.01)
G06F 3/04847 (2022.01)

(52) U.S. Cl.
CPC ...... *G06F 3/04886* (2013.01); *G06F 3/04845* (2013.01); *G06F 3/04847* (2013.01)

(58) Field of Classification Search
None
See application file for complete search history.

(56) References Cited

U.S. PATENT DOCUMENTS

| | | | | |
|---|---|---|---|---|
| 7,720,552 B1 * | 5/2010 | Lloyd | ................. | G06F 3/04847 345/184 |
| 9,430,042 B2 | 8/2016 | Levin | | |
| 9,836,142 B2 | 12/2017 | Craig et al. | | |
| 10,705,629 B1 * | 7/2020 | Arnold | ................ | G06F 3/03547 |
| 10,838,525 B2 | 11/2020 | Chu et al. | | |
| 10,852,854 B2 | 12/2020 | Nieh et al. | | |
| 11,042,232 B2 * | 6/2021 | Park | ........................ | G06F 3/147 |
| 11,209,919 B1 * | 12/2021 | Lin | ........................ | G06F 3/038 |
| 2006/0026535 A1 * | 2/2006 | Hotelling | .............. | G06F 3/0488 715/863 |
| 2010/0156809 A1 * | 6/2010 | Nutaro | .................. | G06F 3/0488 340/407.1 |
| 2011/0239155 A1 * | 9/2011 | Christie | ................ | G06F 3/0482 715/784 |
| 2012/0218293 A1 * | 8/2012 | Yamasaki | ............. | G06F 3/0483 345/629 |
| 2013/0038549 A1 * | 2/2013 | Kitada | ................ | G06F 3/04886 345/173 |
| 2013/0249814 A1 * | 9/2013 | Zeng | .................. | G06F 3/04817 345/173 |

(Continued)

FOREIGN PATENT DOCUMENTS

CN 103858088 A 6/2014
WO WO-2013056913 A1 * 4/2013 ......... G06F 3/03544

*Primary Examiner* — Linda Huynh
(74) *Attorney, Agent, or Firm* — McCoy Russell LLP

(57) ABSTRACT

Various methods and systems are provided for touchscreens including an interface with a spin wheel widget. In one embodiment, a system comprises: a touchscreen display; and a computing device operably coupled to the touchscreen display and storing instructions in non-transitory computer memory that when executed, cause the computing device to: detect touch inputs applied to the touchscreen display; and responsive to detecting the touch inputs, output a graphical user interface (GUI) to the touchscreen display and orient the GUI based on an arrangement of the touch inputs.

20 Claims, 16 Drawing Sheets

(56) References Cited

U.S. PATENT DOCUMENTS

| | | | | |
|---|---|---|---|---|
| 2017/0024121 A1* | 1/2017 | Park | .................... | G06F 3/0485 |
| 2018/0074639 A1* | 3/2018 | Powell | .................... | G06F 3/044 |
| 2018/0084937 A1* | 3/2018 | Joo | .................... | F24C 7/082 |
| 2018/0129347 A1* | 5/2018 | Files | .................... | G06F 3/04162 |
| 2019/0160686 A1* | 5/2019 | Riedel | .................... | G06F 3/04883 |
| 2020/0004348 A1* | 1/2020 | Knoppert | .................... | G06F 3/0393 |
| 2020/0004376 A1* | 1/2020 | Knoppert | .................... | G06F 3/0418 |
| 2020/0089337 A1* | 3/2020 | Togashi | .................... | G02F 1/13338 |
| 2020/0174587 A1* | 6/2020 | Park | .................... | B60K 35/60 |
| 2021/0173542 A1* | 6/2021 | Hinson | .................... | G06F 3/0488 |
| 2022/0134884 A1* | 5/2022 | Chung | .................... | H04W 76/10 |
| | | | | 345/184 |
| 2022/0137727 A1* | 5/2022 | Kono | .................... | G06F 3/0448 |
| | | | | 345/174 |
| 2022/0234444 A1* | 7/2022 | Hosokawa | .................... | B60K 35/22 |
| 2022/0350474 A1* | 11/2022 | Matsushita | .................... | G06F 3/041 |

* cited by examiner

SYSTEMS AND METHODS FOR A TOUCHSCREEN INTERFACE WITH SPIN WHEEL WIDGET

FIELD

Embodiments of the subject matter disclosed herein relate to touchscreens, and in particular, to a touchscreen including an interface with a spin wheel widget.

BACKGROUND

A touch-sensitive display, such as a projected capacitive (PCAP) touchscreen display, may be configured to present visual information such as in the form of text and graphics to an operator. The touchscreen display may be used by the operator to enter commands, visualize data, etc. The operator may interact with the touchscreen by using their fingers, for example, to adjust parameters displayed by the touchscreen display. A graphical user interface (GUI) may be displayed by the touchscreen display and the operator may interact with the GUI by touching the touchscreen display. The GUI may respond differently according to various touch motions applied to the touchscreen display by the operator, such as pinching motions, dragging motions, etc.

BRIEF DESCRIPTION

In one embodiment, a system comprises: a touchscreen display; and a computing device operably coupled to the touchscreen display and storing instructions in non-transitory computer memory that when executed, cause the computing device to: detect touch inputs applied to the touchscreen display; and responsive to detecting the touch inputs, output a graphical user interface (GUI) to the touchscreen display and orient the GUI based on an arrangement of the touch inputs.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

DETAILED DESCRIPTION

Figure 8:
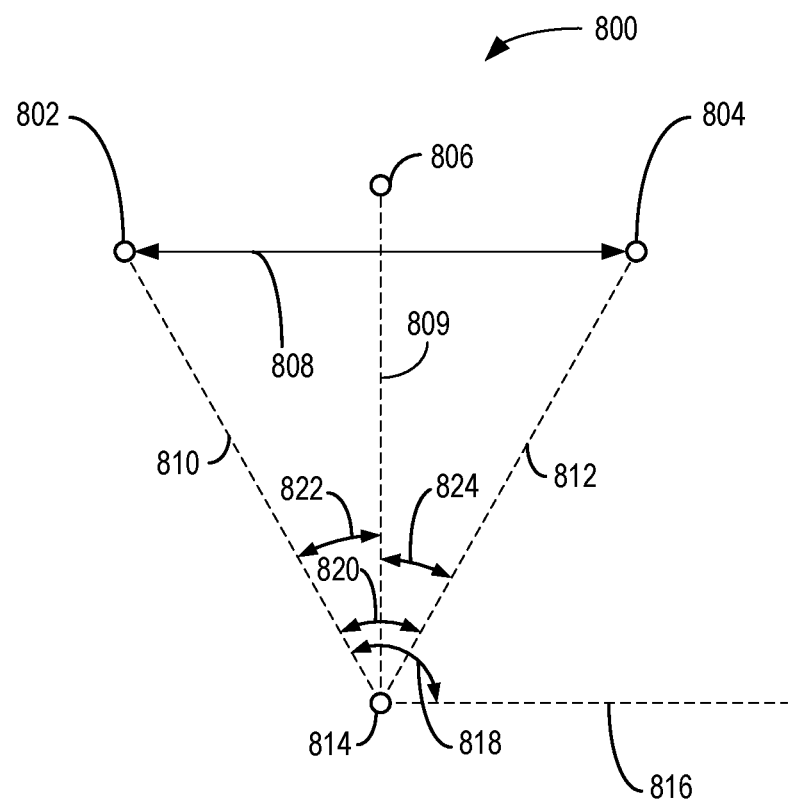
FIG. 8 shows a diagram illustrating a detent orientation of a spin wheel widget GUI of a touchscreen display.
Figure 9:
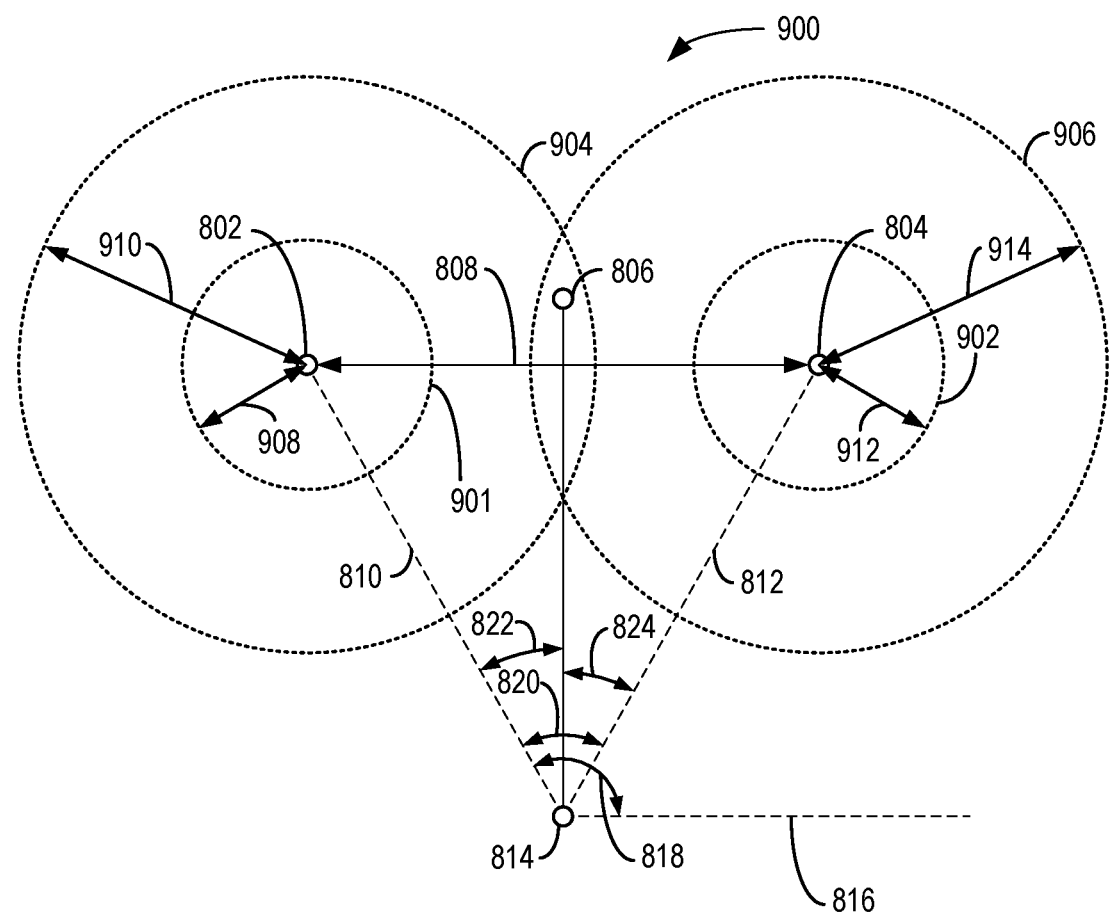
FIG. 9 shows a diagram illustrating a detent adjustment tolerance for a spin wheel widget GUI of a touchscreen display.
Figure 10:
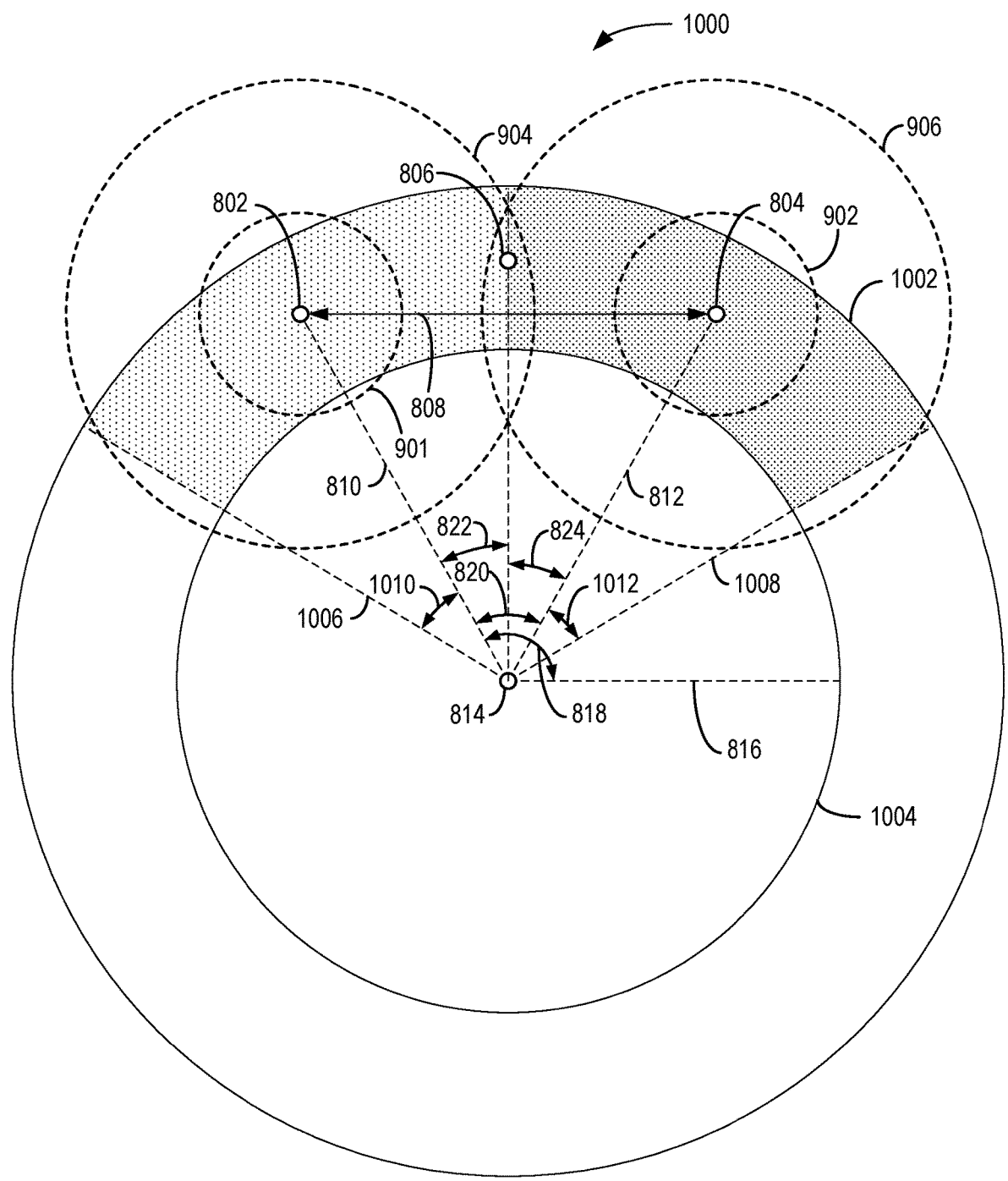
FIG. 10 shows another diagram illustrating a detent adjustment tolerance for a spin wheel widget GUI of a touchscreen display.
Figure 11:
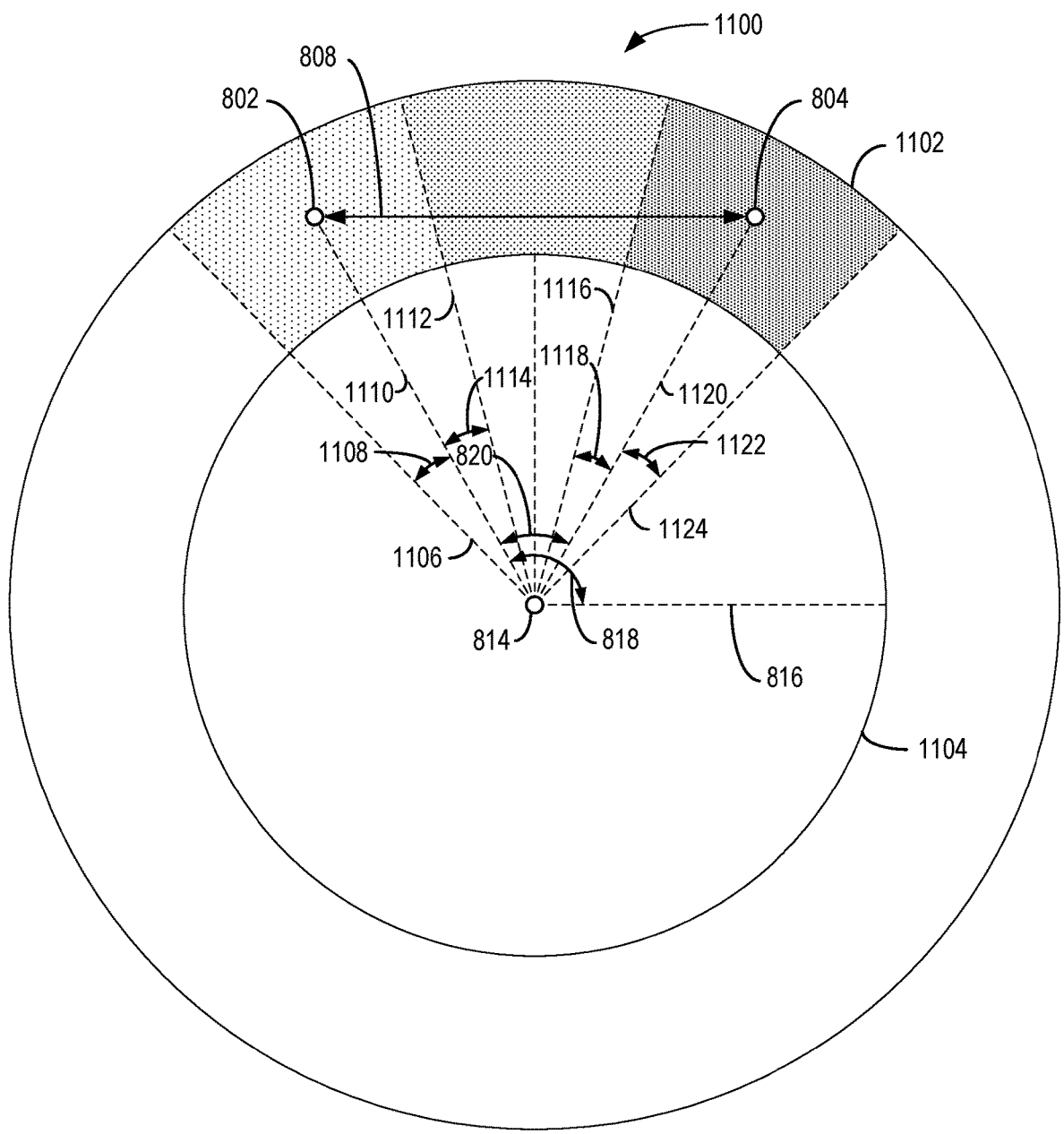
FIG. 11 shows another diagram illustrating a detent adjustment tolerance for a spin wheel widget GUI of a touchscreen display.

The following description relates to various embodiments for touchscreen systems with touchscreen displays configured to display a spin wheel widget graphical user interface. A touchscreen system, such as the touchscreen system shown by FIGS. 1-2, includes a touchscreen display. The touchscreen display is configured to display a spin wheel widget graphical user interface (GUI) including a plurality of detents, such as the GUI shown by FIGS. 3-5 and 12-15, responsive to touch inputs applied to the touchscreen display. The touch inputs may be applied by a user of the touchscreen display via a stylus or fingers of the user, and/or the touch inputs may be applied via a rotary user interface coupled to the touchscreen display. The touchscreen system may determine the source of the touch inputs based on a relative arrangement of the touch inputs, such as the arrangements shown by FIGS. 6-7. The detents of the GUI may be spaced apart from each other, as shown by FIG. 8, and during conditions in which the user inputs a command to adjust a detent selection of the GUI, the touchscreen system may define (e.g., generate) a selection margin for each detent, as shown by FIGS. 9-11. The GUI displayed by the touchscreen display may be based on the location of the touch inputs, as described with reference to the flowchart shown by FIG. 16. By configuring the touchscreen system to display the spin wheel widget GUI responsive to the touch inputs, one or more parameters controlled by the GUI may be more easily adjusted.

The present disclosure relates to a proposed spin wheel widget that gives a more advanced user experience with support for detent-based response like in the physical com wheel. This implementation also makes the spin wheel a smart GUI improving user experience. The spin wheel widget is smarter to enhance user experience.

According to the present disclosure, a detent based spin wheel widget includes discrete steps for one rotation, replicating a more realistic physical corn wheel. The GUI spin wheel widget may be location-based, gesture-based, and/or corn-wheel construction based. Auto-centering of the spin wheel widget may be provided. Auto-alignment of the detents of the spin wheel widget with respect to the touch location may be provided. A radius of the spin wheel widget may be auto-corrected to accommodate tolerances. The GUI may include support for gesture-based start-up for users using their hands without the com-wheel. Support may be included for a touch panel-based com wheel with detent and align pins and may include detent feedback. The spin wheel widget may include auto-hide and auto-available (e.g., auto-display) on-demand features. The spin wheel widget may further include noise margin-based boundary identification for detents. The GUI may be a local dynamic GUI. The GUI may include last state memory without actual settings update and/or touch event software debouncing. The GUI may include haptic feedback for every detent change for more a realistic user experience.

Figure 1:
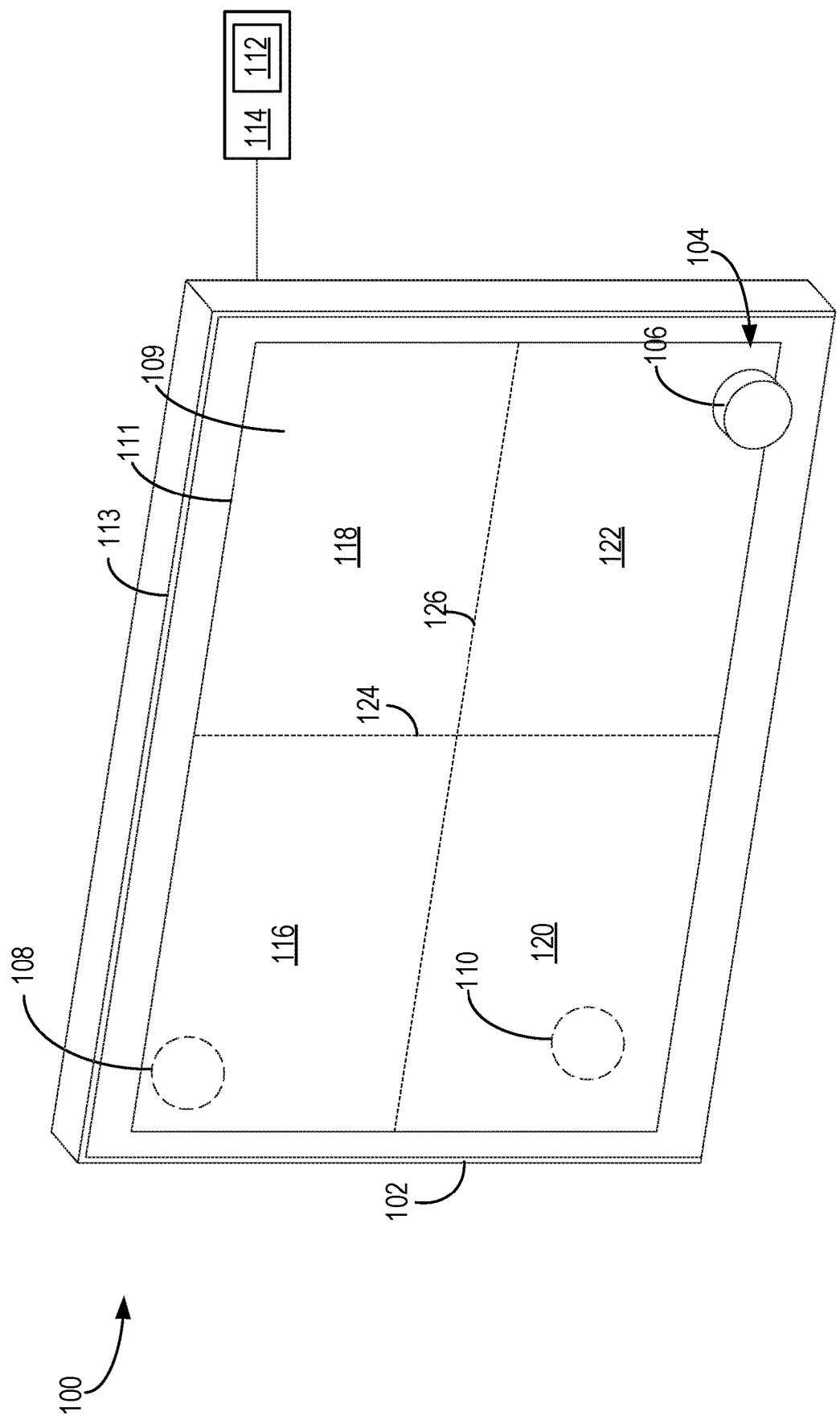
FIG. 1 shows a perspective view of a touchscreen system including a rotary user interface and a touchscreen display configured to display a spin wheel widget graphical user interface (GUI).

Referring to FIG. 1, a perspective view of a touchscreen system 100 including a touchscreen display 102 (e.g., touch-sensitive display screen) and a user interface is shown. The user interface 104 may be referred to herein as a com wheel and/or rotary user interface. The touchscreen system 100 may include an electronic processor, controller, memory, and/or other electronic components interfaced with the touchscreen display 102. For example, the touchscreen system 100 may include an electronic controller 112 including a processor 114 (e.g., a graphics processor) electronically coupled with the touchscreen display 102, and the electronic controller 112 may transmit electronic signals to the touchscreen display 102 for displaying images, data, etc. to a user of the touchscreen system 100 (e.g., a clinician) via the touchscreen display 102. As one example, the electronic controller 112 may transmit signals to the touchscreen display 102 to display a graphical user interface (GUI) via the touchscreen display 102. The GUI may update and/or respond to the position of the com wheel 104 along the touchscreen display 102 and/or touch inputs applied to the touchscreen display 102 by the user via a stylus and/or fingers of the user at the location of the GUI, as described below.

The com wheel 104 is repositionable along the touchscreen display 102 and may be mounted to the touchscreen display via a touchscreen mounting element, as described further below. For example, an operator of the touchscreen system 100 (e.g., a clinician, technician, etc.) may remove the com wheel 104 from engagement with the touchscreen display 102 and may re-engage the com wheel 104 with the touchscreen display 102 via the touchscreen mounting element at a plurality of different positions along the touchscreen display 102 (e.g., first position 108, second position 110, etc.).

Because the com wheel 104 is removable from the touchscreen display 102, the com wheel 104 may be easily cleaned, maintained, etc. Further, the touchscreen display 102 may be more easily cleaned, maintained, etc. The com wheel 104 may be used with a variety of different touchscreen displays. For example, various touchscreen displays may be configured to display a GUI that updates and/or responds to the position of the com wheel 104. As one example, a GUI may include a widget that is displayed by a touchscreen display (e.g., touchscreen display 102) during conditions in which the com wheel 104 is mounted to the touchscreen display, and during conditions in which the com wheel 104 is removed from the touchscreen display, the widget may be removed from the GUI (e.g., not displayed by the touchscreen display).

The touchscreen display 102 includes a touch-sensitive surface 109, and during conditions in which the com wheel 104 is engaged with the touchscreen display 102 at the touch-sensitive surface 109, the touchscreen display 102 may detect the position of the com wheel 104 along the touch-sensitive surface 109.

Figure 2:
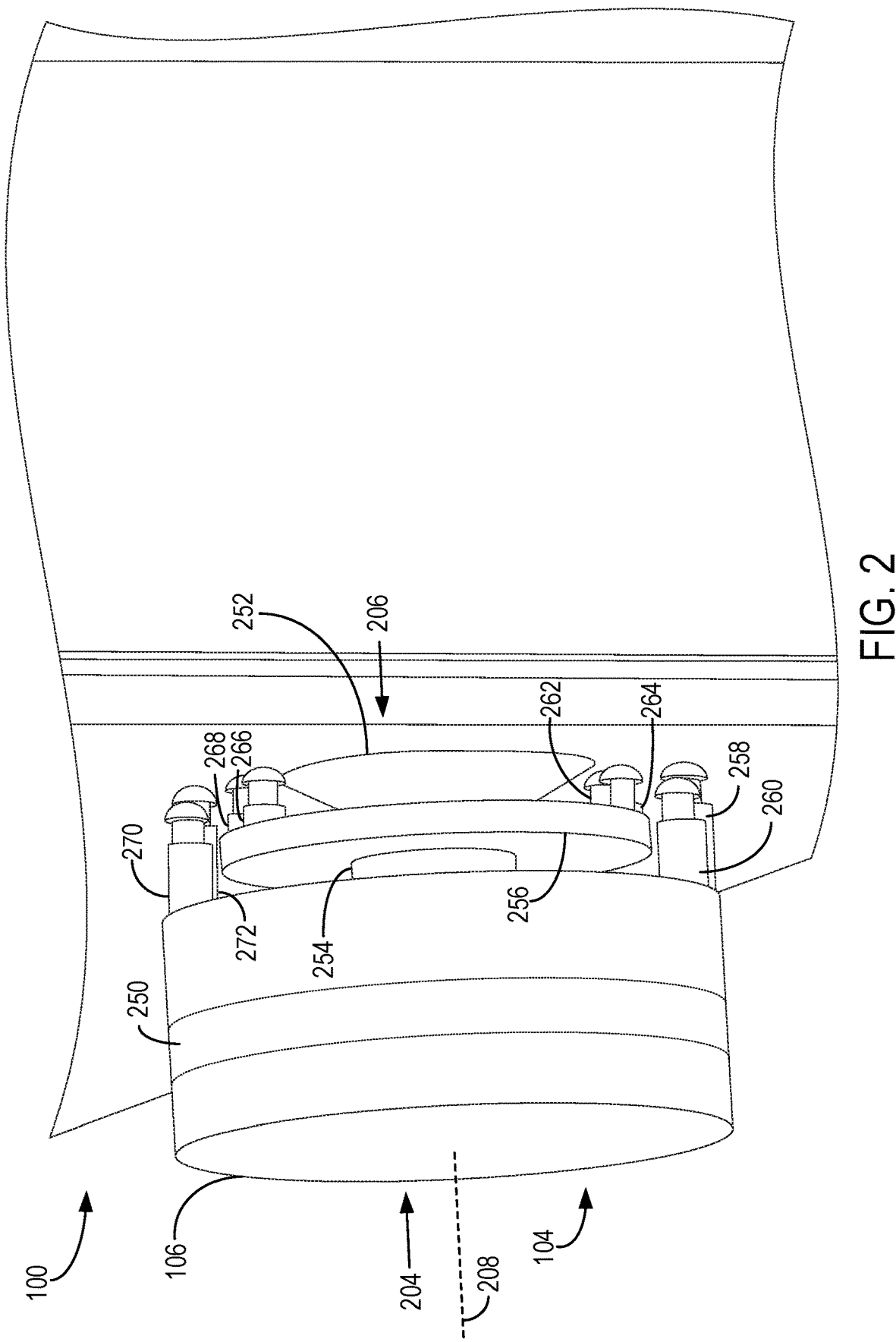
FIG. 2 shows an enlarged perspective view of the touchscreen display and rotary user interface of FIG. 1.

Referring to FIG. 2, the com wheel 104 is shown mounted to the touchscreen display 102. The com wheel 104 includes touchscreen mounting element 252 configured to maintain the position (e.g., translational position) of the com wheel 104 relative to the touchscreen display 102. In some examples, the touchscreen mounting element 252 is a suction cup. The touchscreen mounting element 252 is joined to a support 254, with the support 254 joined to a rotary knob 106 (which may be referred to herein as a rotary interface wheel). In particular, the touchscreen mounting element 252 may be joined to an enlarged end section 256 of the support 254. The rotary knob 106 may be centered along a central axis 208 of the com wheel 104. The operator may press the touchscreen mounting element 252 of the com wheel 104 against the touchscreen display 102 to mount the com wheel 104 to the touchscreen display 102, with first end 204 of the com wheel 104 arranged away from the touchscreen display 102 and second end 206 of the com wheel 104 arranged toward the touchscreen display 102. In examples in which the touchscreen mounting element 252 is a suction cup, pressing the com wheel 104 against the touchscreen display 102 may release air from an interior of the suction cup to atmosphere, and a pressure differential between the interior of the suction cup and atmospheric air may maintain the position of the com wheel 104 against the touchscreen display 102.

The com wheel 104 includes a plurality of pin supports. The pin supports are coupled to pins that may come into contact with the touchscreen display 102 during some conditions. Some of the pins included by the com wheel 104 may be configured to provide an indication of a rotational position of the rotary knob 106 to the electronic controller 112 of the touchscreen display 102, some of the pins may be configured to provide an indication of an axial position of the rotary knob 106 to the electronic controller 112, and some of the pins may be configured to provide an indication of a translational position of the com wheel 104 along the touchscreen display 102 to the electronic controller 112. In the embodiment shown, the com wheel 104 includes a set of pin supports coupled to pins configured to provide the indication of the rotational position of the rotary knob 106 to the electronic controller 112, at least one pin support including a pin configured to provide the indication of the axial position of the rotary knob 106, and a set of pin supports coupled to pins configured to provide the indication of the translational position of the com wheel 104 along the touchscreen display 102 to the electronic controller 112.

The set of pin supports coupled to pins configured to provide the indication of the rotational position of the rotary knob 106 to the electronic controller 112 includes a first pin support 258 and a second pin support 272. The com wheel 104 includes a third pin support 262 and a fourth pin support 264 coupled to pins configured to provide the electronic controller 112 with the indication of the translational position of the com wheel 104 along the touchscreen display 102. In the embodiment shown, the com wheel 104 additionally includes a fifth pin support 266 and a sixth pin support 268 coupled to pins configured to provide the electronic controller 112 with the indication of the translational position of the com wheel 104 along the touchscreen display 102.

During some conditions (e.g., conditions in which the com wheel 104 is arranged at an edge of the touchscreen display 102 and at least a portion of the com wheel 104 overhangs the outer edge 113 and/or bezel 111), the pins coupled to the third pin support 262 and the fourth pin support 264 may be arranged against the surface of the touchscreen display 102 while the pins coupled to the fifth pin support 266 and the sixth pin support 268 may be arranged off of the surface of the touchscreen display 102. During such conditions, the electronic controller 112 may determine the translational position of the com wheel 104 along the touchscreen display 102 based on the positions of the pins coupled to the third pin support 262 and the fourth pin support 264. During other conditions, the pins coupled to each of the third pin support 262, fourth pin support 264, fifth pin support 266, and sixth pin support 268 may each be in direct face-sharing contact with the surface of the touchscreen display 102, and the electronic controller 112 may determine the translational position of the com wheel 104 along the touchscreen display 102 based on the positions of each of the pins coupled to the third pin support 262, fourth pin support 264, fifth pin support 266, and sixth pin support 268. In some embodiments, the determination of the translational position of the com wheel 104 along the touchscreen display 102 may additionally be based on the position of the pins coupled the first pin support 258 and the second pin support 272.

The com wheel 104 includes a seventh pin support 260 coupled to a pin configured to provide the electronic controller 112 with an indication of the axial position of the rotary knob 106. In particular, during conditions in which the rotary knob 106 is pressed toward the touchscreen display 102 by the operator (e.g., the rotary knob 106 is in a first axial position), the pin coupled to the seventh pin support 260 may come into direct face-sharing contact with the surface of the touchscreen display 102. The electronic controller 112 may determine that the rotary knob 106 is pressed by the operator based on the contact between the pin coupled to the seventh pin support 260 and the surface of the touchscreen display 102.

During conditions in which the rotary knob 106 is not pressed against the touchscreen display 102 (e.g., the rotary knob 106 is in a second axial position), the pin coupled to the seventh pin support 260 may not be in direct face-sharing contact with the surface of the touchscreen display 102, and as a result, the electronic controller may determine that the rotary knob 106 is not pressed by the operator. In the embodiment shown, the com wheel 104 further includes an eighth pin support 270 coupled to a pin that may come into direct contact with the surface of the touchscreen display 102 during conditions in which the pin coupled to the seventh pin support 260 comes into direct contact with the surface of the touchscreen display 102. The determination of the axial position of the rotary knob 106 may be based on the position of both of the pin coupled to the seventh pin support 260 and the pin coupled to the eighth pin support 270.

Determining the position of the com wheel 104 and/or rotary knob 106 based on the position of the pins as described herein refers to determining the position of the pins (e.g., sensing, measuring, etc. the position of the pins) along the touchscreen display 102 via contact between the pins and the touchscreen display 102. As one example, during conditions in which the com wheel 104 is mounted to the touchscreen display 102 and the pin coupled to the first pin support 258 is in direct face-sharing contact with the surface of the touchscreen display 102, the electronic controller 112 may determine the position of the pin coupled to the first pin support 258 based on signals transmitted to the electronic controller 112 by the touchscreen display 102 responsive to the contact between the pin coupled to the first pin support 258 and the touchscreen display 102.

In some embodiments, the rotary knob 106 and/or other components of the com wheel 104 may include electrically conductive bands, rings, etc. configured to come into direct contact with the fingers of the operator during conditions in which the operator touches the com wheel 104. For example, an example electrically conductive ring 250 of the com wheel 104 is shown by FIG. 2. During conditions in which the operator touches the rotary knob 106, the operator may additionally touch the conductive ring 250 (e.g., the operator may grasp the rotary knob 106 with their fingers, and grasping the rotary knob 106 may result in direct contact of the fingers of the operator with the conductive ring 250). The conductive ring 250 may be electrically coupled with the conductive portion of each of the tips (e.g., the pins), such that during conditions in which the com wheel 104 is mounted to the touchscreen display 102 and the operator touches the conductive ring 250 (e.g., by grasping the rotary knob 106), the conductive portion of each tip may form an electrical pathway between the touchscreen display 102 and the operator via the conductive ring 250 (which may result in detection of the location of the com wheel 104 by the touchscreen display 102 as described above). As a result, the com wheel 104 may communicate with the touchscreen display 102 via the conductive ring 250 and conductive tips to indicate conditions in which the user is interacting with the com wheel 104.

The touchscreen display 102 of the touchscreen system 100 described above with reference to FIGS. 1-2 may be configured to display a spin wheel widget graphical user interface during conditions in which touch inputs are applied to the touchscreen display 102, similar to the examples described below. The spin wheel widget graphical user interface (GUI) may be configured based on the location of the touch inputs along the touchscreen display 102. In some examples, the spin wheel widget GUI may have a first configuration during conditions in which the touch inputs are applied to a first section of the touchscreen display 102, and the spin wheel widget GUI may have a second configuration during conditions in which the touch inputs are applied to a second section of the touchscreen display 102. For example, as shown by FIG. 1, the touch-sensitive surface 109 of the touchscreen display 102 may include a first section 116, a second section 118, a third section 120, and a fourth section 122 (with the sections defined by axis 124 and axis 126) The spin wheel widget GUI may have a different configuration based on whether the touch inputs are applied to the first section 116, the second section 118, the third section 120, or the fourth section 122. The touch inputs may be applied by the user via a stylus or fingers of the user, or the touch inputs may be applied by the com wheel 104 as described above. Although the touchscreen display 102 is described above as including four sections, in other examples the touchscreen display 102 may include a different number of sections and/or shape of the sections. As one example, each section may have a shape corresponding to other GUI elements displayed by the touchscreen display 102.

The touchscreen system 100 may determine the source of the touch inputs applied to the touchscreen display 102 based on the arrangement of the touch inputs. For example, the touchscreen system 100 may be configured to detect touch inputs applied to the touchscreen display 102 in the relative arrangement of the pins of the com wheel 104, and during conditions in which the pins of the com wheel are engaged in direct contact with the touch-sensitive surface 109 of the touchscreen display 102, the electronic controller 112 of the touchscreen system 100 may identify the source of the touch inputs as originating from the com wheel 104. The particular arrangement of the touch inputs applied to the touchscreen display 102 by the com wheel 104 may be referred to herein as a touch input signature of the com wheel 104. As another example, the electronic controller 112 may be configured to detect a particular gesture formed by a touch inputs applied to the touchscreen display 102 and/or a particular sequence of touch inputs applied to the touchscreen display 102 by the user via a stylus or the fingers of the user, and during conditions in which the particular gesture is detected by the touchscreen system 100, the electronic controller 112 may determine that the source of the touch inputs is the stylus or fingers of the user and not the com wheel 104. The particular gesture (e.g., double-tap, triple-tap, etc.) may also be referred to herein as a touch input signature. The touch input signatures may be stored in non-transitory computer memory of the electronic controller 112.

Figure 3:
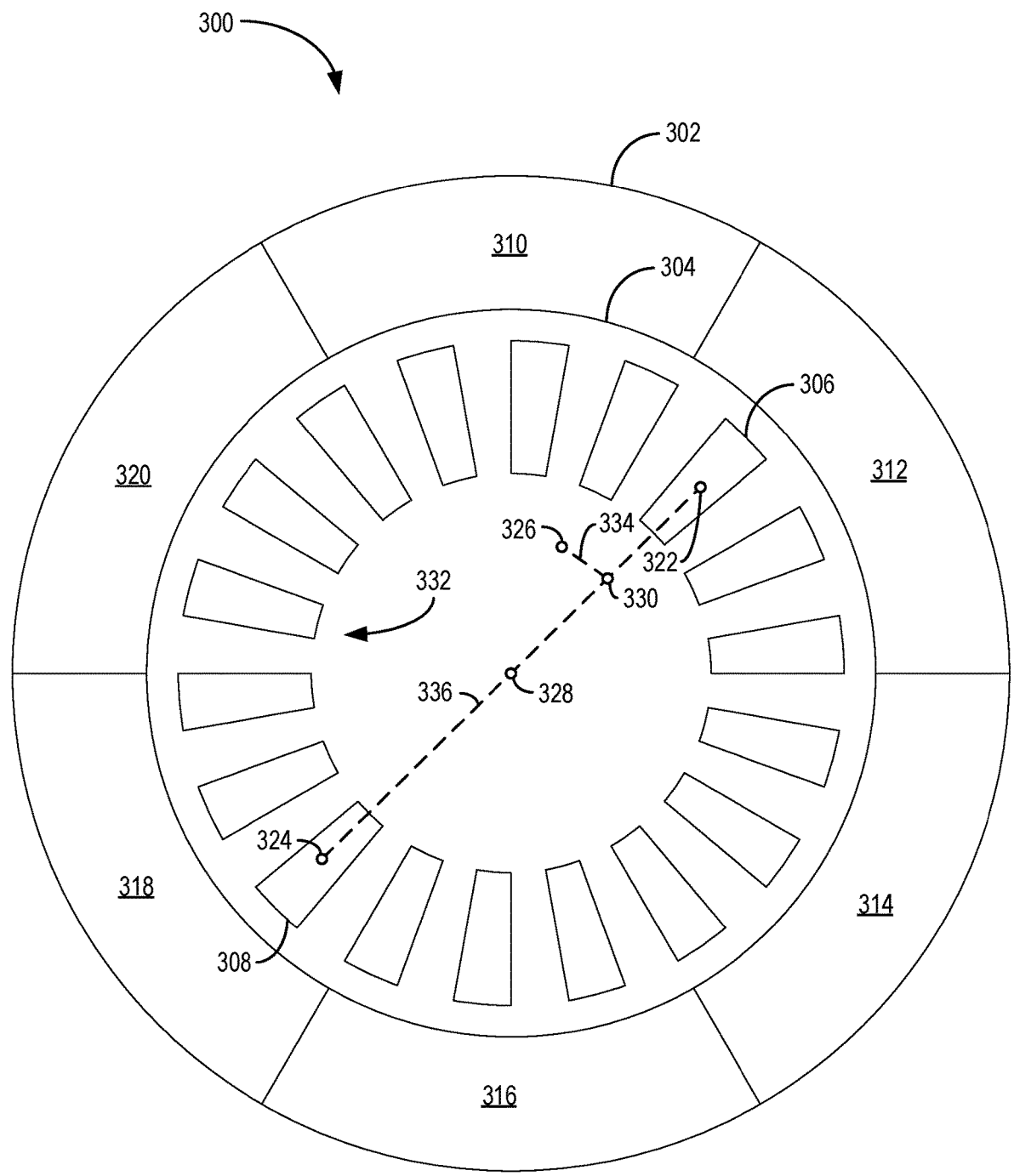
FIG. 3 shows a spin wheel widget GUI that may be displayed by a touchscreen display.

Referring to FIG. 3, a spin wheel widget GUI 300 that may be displayed by a touchscreen display is shown. The touchscreen display may be similar to, or the same as, the touchscreen display 102 described above with reference to FIGS. 1-2. The touchscreen display may be included by a touchscreen system, such as the touchscreen system 100 described above with reference to FIGS. 1-2. Components of the touchscreen system and/or touchscreen display described herein with reference to the example shown by FIG. 3 may be similar to, or the same as, the components similarly named and described above with reference to FIGS. 1-2, and may not be re-introduced.

FIG. 3 indicates how the touchscreen display may sense nibs of a com wheel prior to a user-initiated touch event. The markers indicate the rotating nibs, alignment nibs, and center of the com wheel.

In the configuration of the spin wheel widget GUI 300 shown by FIG. 3, the spin wheel widget GUI 300 has a circular shape and includes a plurality of outer sections forming an outer perimeter 302 and an inner perimeter 304 of GUI elements surrounding a plurality of inner sections 332. In the example shown, the spin wheel widget GUI 300 includes a first outer section 310, a second outer section 312, a third outer section 314, a fourth outer section 316, a fifth outer section 318, and a sixth outer section 320, with each of the outer sections arranged annularly around a center 328 of the spin wheel widget GUI 300. The center 328 of the spin wheel widget GUI 300 may be positioned along the touchscreen display based on touch inputs applied to the touchscreen display, similar to the examples described further below. Although the spin wheel widget GUI 300 is shown including six outer sections, in other examples the spin wheel widget GUI may include a different number of outer sections (e.g., eight, ten, etc.). Each of the outer sections may include data and or may be interacted with by the user in order to navigate other portions of other GUIs displayed by the touchscreen display. For example, the user may interact with the outer sections in order to adjust parameters displayed by the touchscreen display, such as medical patient data.

The spin wheel widget GUI 300 includes the plurality of inner sections 332, which may be referred to herein as detents, arranged annularly around center 328. Detents, as described herein, refer to graphical user interface features of the spin wheel widget GUI. A detent may be selected by the user, for example, to adjust parameters controlled by the GUI (e.g., data displayed by the touchscreen display, such as patient medical data). The user may interact with the detents by applying touch inputs to the spin wheel widget GUI 300 in order to adjust one or more parameters controlled by the spin wheel widget GUI 300, as one example. The parameters may include numerical medical patient data, in some examples. Although in the configuration shown by FIG. 3 the spin wheel widget GUI 300 includes eighteen detents, and other configurations the spin wheel widget GUI may include a different number of detents (e.g., sixteen, twenty, etc.). In some examples, the number of detents included by the spin wheel widget GUI may be based on the location of the touch inputs applied to the touchscreen display.

An orientation of the detents may be based on the touch inputs applied to the touchscreen display used to command the touchscreen display to display the spin wheel widget GUI 300. As one example, the touch inputs may include a first touch input represented by marker 322, a second touch input represented by marker 324, a third touch input represented by marker 326, and a fourth touch input represented by marker 330. The first, second, third, and fourth touch inputs may each be applied by a com wheel in the example shown by FIG. 3, such as the com wheel 104 described above with reference to FIGS. 1-2.

An electronic controller of the touchscreen display, such as the electronic controller 112 shown by FIG. 1 and described above, may detect the touch inputs applied to the touchscreen display and may determine that the com wheel is the source of the touch inputs based on the relative arrangement of the touch inputs (e.g., the touch input signature). For example, the electronic controller (which may be referred to herein simply as the controller) may determine a length between the first touch input and the second touch input along axis 336 extending through the center 328, and the controller may determine a length between the third touch input and the fourth touch input along axis 334. The controller may compare the lengths and/or one or more angles between the lengths to a pre-determined touch input signature stored in the memory of the controller in order to determine that the com wheel is the source of the touch inputs. In other examples, as described below, the controller may compare the touch inputs to pre-determined touch input signatures stored in the memory of the controller that are associated with gestures that may be applied to the touchscreen display by the user in order to command the controller to display the spin wheel widget GUI 300 (e.g., double-tap gesture, triple-tap gesture, etc.).

In some examples, a diameter of the spin wheel widget GUI 300, a number of detents included by the spin wheel widget GUI 300, and/or a rotational position of each detent of the spin wheel widget GUI 300 may be based on the touch inputs applied to the touchscreen display to command the electronic controller to display the spin wheel widget GUI 300. For example, because the com wheel may be configured with a pre-determined arrangement of pins configured to engage directly with the touch-sensitive surface of the touchscreen display, the electronic controller of the touchscreen system may detect an orientation of the com wheel relative to the touchscreen display based on the touch inputs applied to the touchscreen display by the com wheel. The electronic controller may configure the orientation of the detents of the spin wheel widget GUI based on the orientation of the com wheel, with the orientation of the com wheel determined by the controller based on the relative arrangement of the touch inputs applied to the touchscreen display by the com wheel.

As one example, in the configuration shown by FIG. 3, the first touch input represented by marker 322 defines a location of a first detent 306 of the plurality of detents, where the first detent 306 may be referred to herein as a reference detent. The reference detent may be a detent of the spin wheel widget GUI 300 that is automatically selected responsive to the command received by the electronic controller to display the spin wheel widget GUI 300 (e.g., via the touch inputs). Each other detent of the plurality of detents may be arranged relative to the reference detent, such as detent 308 arranged across from the reference detent. In the example shown, the detent 308 is arranged at a location of the second touch input represented by marker 324, where the first touch input and the second touch input may each result from engagement of respective rotational pins of the com wheel directly with the touch-sensitive surface of the touchscreen display. The third touch input represented by marker 326 and the fourth touch input represented by marker 330 may each result from engagement of respective alignment pins directly with the touch-sensitive surface of the screen display.

The user may adjust the detent selection by rotating the com wheel while the com wheel is engaged with the touchscreen display. For example, during conditions in which the user rotates the com wheel, the touch inputs applied to the touchscreen display may move in a direction around the center 328. As a result of the movement of the touch inputs applied to the touchscreen display by the com wheel, the controller may update the detent selection (e.g., select a different detent of the plurality of detents instead of the reference detent). Selection of a detent may graphically update the spin wheel widget GUI 300 in order to indicate to the user which of the detents is selected. As one example, portions of the spin wheel widget GUI 300 may include a different pattern, color, etc. to indicate the selected detent. In some examples, adjusting the selection of the detent may result in haptic feedback provided by the touchscreen display. For example, during conditions in which the adjustment of the selection of the detent is detected by the controller, the controller may control one or more motors/actuators arranged within an interior of the touchscreen display in order to provide haptic feedback at the location of the reference detent and/or other detents included by the spin wheel widget GUI 300, such as the selected detent. In some examples, a configuration of the spin wheel widget GUI may be based on a location of the touchscreen display at which the touch inputs are applied in order to command the controller to display the spin wheel widget GUI.

In some examples, the configuration of the spin wheel widget GUI may be based on the type of touch input applied to the touchscreen display. For example, during conditions in which the controller determines that the touch inputs applied to the touchscreen display are a result of direct contact of a stylus or fingers of the user against the touchscreen display, the spin wheel widget GUI may have a first configuration, and during conditions in which the controller determines that the touch inputs applied to the touchscreen display are a result of engagement of a com wheel (e.g., com wheel 104 described above with reference to FIGS. 1-2) against the touchscreen display, the spin wheel widget GUI may have a different, second configuration. As one example, the first configuration may include a first number of detents while the second configuration may include a different, second number of detents.

During conditions in which touch inputs are applied to the touchscreen display via a stylus and/or fingers of the user at a first location along the touchscreen display and a com wheel (e.g., com wheel 104 described above with reference to FIGS. 1-2) is engaged with the touchscreen display at a second location along the touchscreen display, the controller may display a first spin wheel widget GUI at the first location and a second spin wheel widget GUI at the second location. In some examples, the first spin wheel widget GUI may have a different configuration (e.g., shape, number of detents, etc.) relative to the second spin wheel widget GUI. In other examples, the first spin wheel widget GUI may have a same configuration as the second spin wheel widget GUI.

Figure 4:
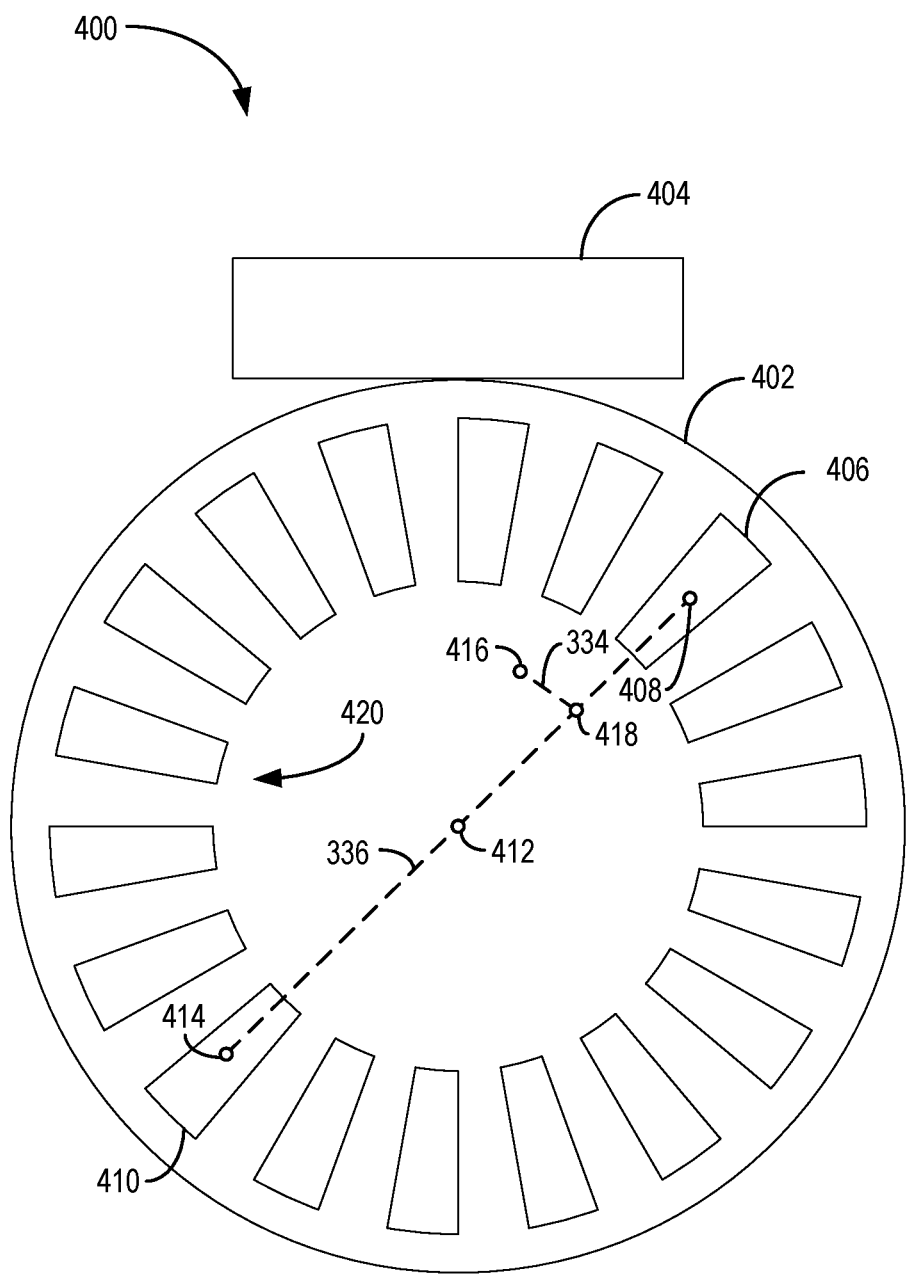
FIG. 4 shows another spin wheel widget GUI that may be displayed by a touchscreen display.

Referring to FIG. 4, another spin wheel widget GUI that may be displayed by a touchscreen display is shown. The touchscreen display may be similar to, or the same as, the touchscreen display 102 described above with reference to FIGS. 1-2. The touchscreen display may be included by a touchscreen system, such as the touchscreen system 100 described above with reference to FIGS. 1-2. Components of the touchscreen system and/or touchscreen display described herein with reference to the example shown by FIG. 4 may be similar to, or the same as, the components similarly named and described above with reference to FIGS. 1-2, and may not be re-introduced.

In the configuration shown by FIG. 4, the spin wheel widget GUI 400 includes an outer perimeter 402 and does not include the plurality of outer sections shown by the configuration of FIG. 3. The spin wheel widget GUI 400 includes several features similar to those described above with reference to FIG. 3. For example, the spin wheel widget GUI 400 includes a plurality of inner sections 420 which may be referred to herein as detents, with detent 406 being a reference detent and with detent 410 being arranged across from the reference detent. FIG. 4 additionally shows marker 408 indicating a location of a first touch input, marker 414 indicating a location of a second touch input, marker 416 indicating the location of the third touch input, and marker 418 indicating the location of a fourth touch input. Similar to the example described above, the first touch input and the second touch input may result from engagement of rotational pins of a com wheel engaged directly with the touch-sensitive surface of the touchscreen display, and third touch input and the fourth touch input may result from engagement of alignment pins of the com wheel engaged directly with the touch-sensitive surface of the touchscreen display.

The spin wheel widget GUI 400 additionally includes a panel 404 arranged outside of the outer perimeter 402. The panel 404 may control one or more parameters of data displayed by the touchscreen display, in some examples. Although panel 404 has a rectangular shape in the example shown, in other examples the panel 404 may have a different shape (e.g., an elliptical shape, triangular shape, etc.). As described above, the spin wheel widget GUI displayed by the touchscreen display may be based on the location of the touch inputs along the touch-sensitive surface of the touchscreen display. As one example, during conditions in which the touch inputs are applied to a first section of the touch-sensitive surface of the touchscreen display (e.g., first section 116 shown by FIG. 1 and described above), the touchscreen display may display the spin wheel widget GUI 300 shown by FIG. 3 described above, and during conditions in which the touch inputs are applied to a second section of the touch-sensitive surface of the touchscreen display (e.g., second section 118 shown by FIG. 1 and described above), the touchscreen display may display the spin wheel widget GUI 400 shown by FIG. 4. By controlling the configuration of the spin wheel widget GUI based on the location of the touchscreen display at which the touch inputs are applied, the spin wheel widget GUI may be customized for particular applications in order to increase a user friendliness of the touchscreen display and/or user productivity.

Figure 5:
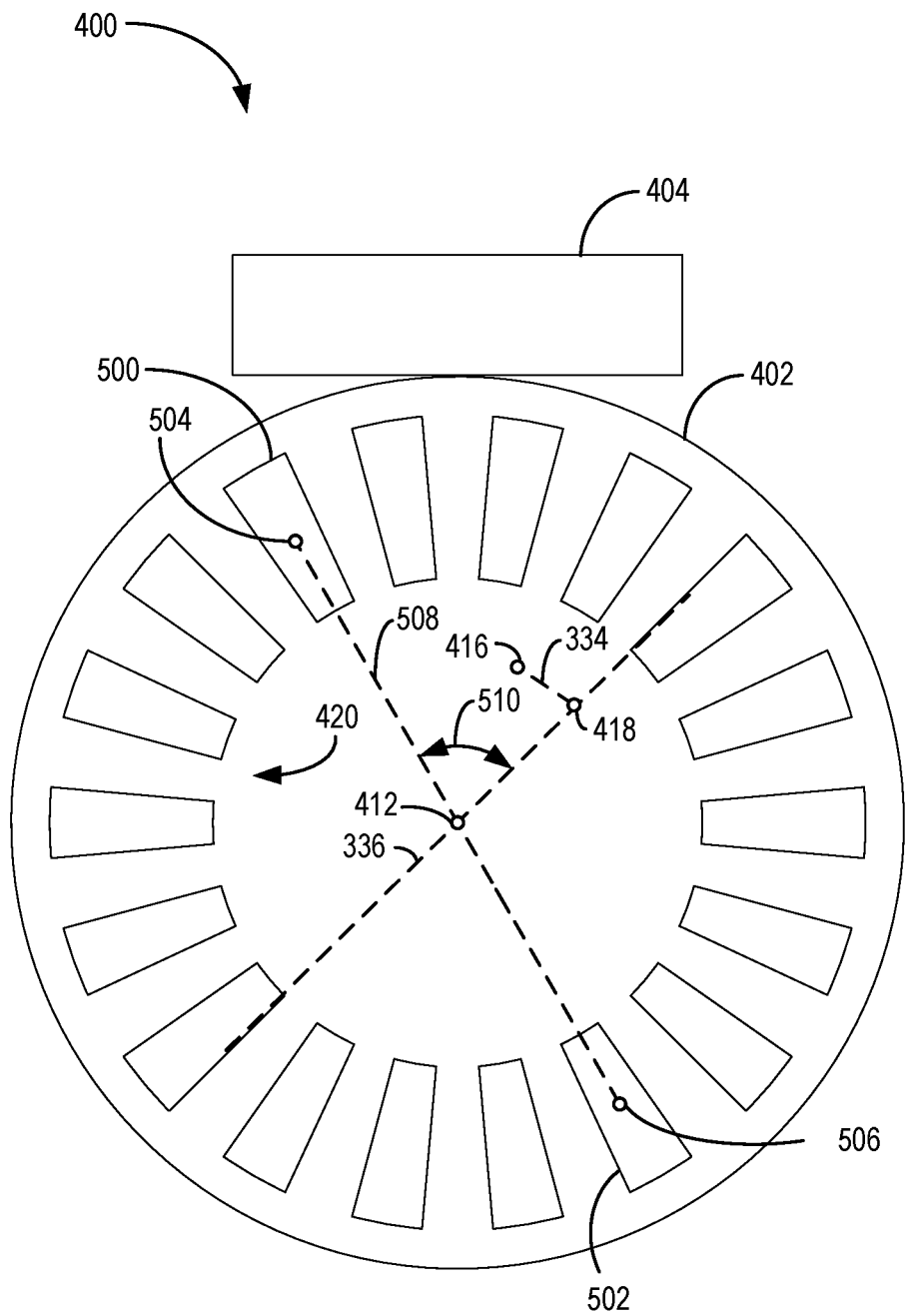
FIG. 5 shows the spin wheel widget GUI of FIG. 4 in a second configuration.

FIG. 4 indicates how the GUI around the spin wheel may change based on location (relative to the configurations shown by FIGS. 3 and 5, for example). Although the configuration shown by FIG. 4 is representative of one example spin wheel widget configuration, other examples may be possible. For example, the touchscreen may include six sections, eight sections, etc. (e.g., "n" sections), and the spin wheel widget GUI may have six different configurations, eight different configurations, etc. (e.g., "n" configurations) based on where the spin wheel widget GUI is displayed on the touchscreen display.

After the triggering and bringing up of the spin wheel widget GUI, if no touch event is detected on the spin wheel for more than a set delay, the spin wheel widget may auto hide. For example, after the touch inputs are applied (e.g., a pre-determined gesture is made against the touchscreen display by the user, or the com wheel is coupled to the touchscreen display) and spin wheel widget GUI is displayed, if the user does not touch the spin wheel widget pre-determined tolerance regions within a pre-determined amount of time (e.g., thirty seconds, one minute, etc.), the spin wheel widget GUI may auto hide, providing the touchscreen display with increased area for display of other information.

An actual radius of the spin wheel widget GUI may be based on the touch inputs. If the actual radius $r_{actual}$ is within r±tolerance r, the spin wheel radius can be increased or decreased based on $r_{actual}$ to increase reliable detent operation to provide increased noise margin. In some examples, the controller may automatically adjust the spin wheel radius responsive to the touch inputs.

The detents of the spin wheel widget GUI may be evenly spaced around the circumference of GUI circle (e.g., within the outer perimeter 402) with a radius r. When the user or com wheel touches the circle, the reference detent may be automatically aligned to reduce a likelihood of the first touch event occurring in a zone in which the first touch event is not recognized.

Referring to FIG. 5, the spin wheel widget GUI of FIG. 4 in a second configuration is shown. The touchscreen display may be similar to, or the same as, the touchscreen display 102 described above with reference to FIGS. 1-2. The touchscreen display may be included by a touchscreen system, such as the touchscreen system 100 described above with reference to FIGS. 1-2. Components of the touchscreen system and/or touchscreen display described herein with reference to the example shown by FIG. 5 may be similar to, or the same as, the components similarly named and described above with reference to FIGS. 1-2, and may not be re-introduced.

In the configuration shown by FIG. 5, the touch inputs applied to the touchscreen display are in a different location relative to the touch inputs described above with reference to FIG. 3 and FIG. 4. In particular, marker 504 indicates a location of a first touch input, and marker 506 indicates a location of a second touch input, with the location of the third touch input indicated by marker 416 and the location of the fourth touch input indicated by marker 418 being the same as described above with reference to FIG. 4. In this configuration, detent 500 is set as the reference detent due to the location of the first touch input indicated by marker 504, with detent 502 being arranged opposite to the detent 500. An axis 508 extending between the location of the first touch input and the second touch input is shown, with the axis 508 arranged at an angle 510 relative to the axis 336 described above.

The first touch input may result from engagement of a first rotational pin of the com wheel engaged directly with the touch-sensitive surface of the touchscreen display, and the second touch input may result from engagement of a second rotational pin of the com wheel engaged directly with the touch-sensitive surface of the touchscreen display. As a result of the location of the first touch input and the second touch input, the detents in the configuration shown by FIG. 5 are rotationally offset around the center 412 relative to the configuration shown by FIG. 4 (e.g., the reference detent is in a different location in the configuration shown by FIG. 5 relative to the configuration shown by FIG. 4, and the location of each other detent shown by FIG. 5 is based on the location of the reference detent). By configuring the reference detent to be arranged at the location of the first touch input, a usability of the spin wheel widget GUI may be increased, similar to the examples described below.

In the configuration shown, the reference detent has aligned to the rotary nibs of the com wheel. The first touch location is where the reference detent will be aligned. The reference detent may be referred to as the zero detent, and based on clockwise or anti-clockwise rotation of touch events on consecutive detents, the direction and number of detents may be adjusted.

For n detents of the spin wheel widget, an angle between each detent may be calculated using the equation $$\theta 3 = \frac{360°}{n}$$

and/or the equation $$\theta 4 = \frac{\theta 3}{2}.$$

θ3 may be indicated by angle 820 shown by FIG. 8 and described below, and θ4 may be indicated by angle 822 and/or angle 824 shown by FIG. 8 and described below. For example, θ3 may be equal to the angle 820, and θ4 may be equal to one or both of the angle 822 and the angle 824 (e.g., angle 822 may be equal to angle 824).

If an odd number of detents are generated, one of the rotational pins of the com wheel may move along a detent while the other rotational pin is arranged along a transition mid-point. Therefore, the controller may determine which of the rotational pins is used to provide the touch input for detent selection.

Figure 6:
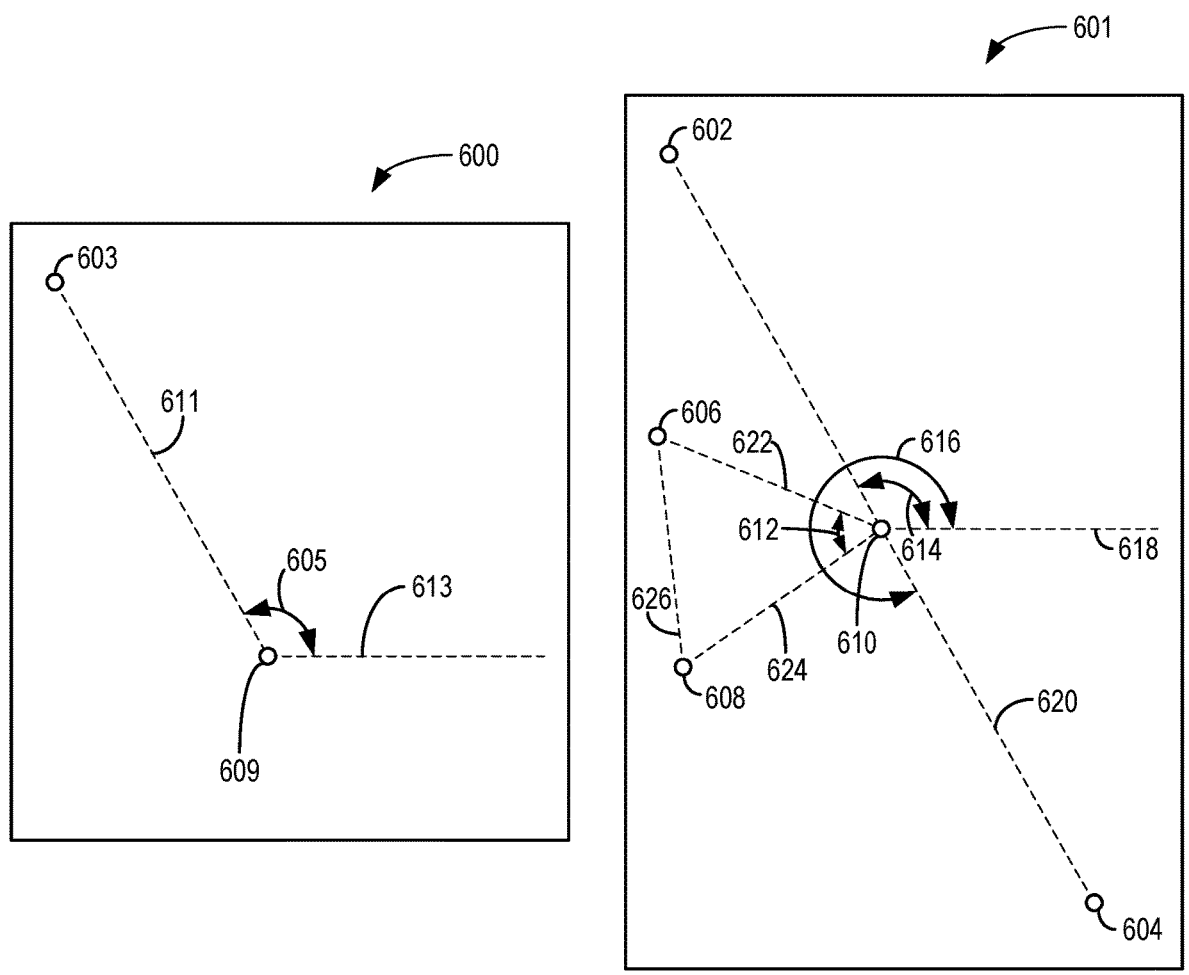
FIG. 6 shows a diagram illustrating a configuration of touch inputs detected by a touchscreen display.

Referring to FIG. 6, two diagrams illustrating configurations of touch inputs detected by a touchscreen display are shown. In particular, diagram 600 illustrates an example configuration of touch inputs applied to the touchscreen display by the user via a stylus and/or fingers of the user, and diagram 601 illustrates an example configuration of touch inputs applied to the touchscreen display by a com wheel engaged directly with the touchscreen display, such as the com wheel 104 described above with reference to FIGS. 1-2. The touchscreen display may be similar to, or the same as, the touchscreen display 102 described above with reference to FIGS. 1-2. The touchscreen display may be included by a touchscreen system, such as the touchscreen system 100 described above with reference to FIGS. 1-2. Components of the touchscreen system and/or touchscreen display described herein with reference to the examples shown by FIG. 6 may be similar to, or the same as, the components similarly named and described above with reference to FIGS. 1-2, and may not be re-introduced.

In the configuration shown by diagram 600 of FIG. 6, a touch input applied to the touchscreen display by the user via a stylus or a finger of the user is indicated by marker 603, and a center of the spin wheel widget graphical user interface displayed by the touchscreen display responsive to the touch input is indicated by marker 609. An axis 611 extending between the center indicated by marker 609 and the touch input indicated by marker 603 is angled relative to horizontal axis 613 by angle 605.

In the configuration shown by diagram 601 of FIG. 6, marker 602 indicates a location of the first touch input to the touchscreen display, marker 604 indicates a location of a second touch input to the touchscreen display, marker 606 indicates a location of a third touch input to the touchscreen display, and marker 608 indicates a location of a fourth touch input to the touchscreen display. Each of the touch inputs may be provided by the com wheel, as described above.

In the configuration shown, axis 620 extends between the marker 602 and the marker 604, axis 622 extends between the marker 606 and center 610, axis 624 extends between the marker 608 and center 610, axis 626 extends between the marker 606 and the marker 608, and axis 618 extends in a horizontal direction from the center 610. The center 610 is a midpoint between the marker 602 and the marker 604 and indicates a location of the center of the com wheel as well as a location of a center of a spin wheel widget GUI to be displayed by the touchscreen display. A portion of the axis 620 arranged between the marker 602 and the center 610 is angled relative to the axis 618 by angle 614, and a portion of the axis 620 extending between the marker 604 and the center 610 is angled relative to the axis 618 by angle 616.

The controller may determine the relative arrangement of the touch inputs by calculating various lengths and angles between the touch inputs. For example, the controller may calculate "r" which refers to the distance between the center 610 and marker 604, and the controller may additionally calculate the distance between the center 610 and marker 602. θ refers to angle 612, θ1 refers to angle 614, θ2 refers to angle 616, r1 refers to the distance between the marker 608 and the center 610, r2 refers to the distance between the marker 606 (for calculation simplicity r1 is considered equal to r2) and the center 610, d refers to the distance between marker 608 and marker 606, x1 and y1 respectively refer to x and y coordinates of marker 602, x2 and y2 respectively refer to x and y coordinates of marker 604, x3 and y3 respectively refer to x and y coordinates of marker 606, x4 and y4 respectively refer to x and y coordinates of marker 608, and x5 and y5 respectively refer to x and y coordinates of center 610. Since r (after correction) may be known by the controller and the center 610 when a touch event occurs may be known, θ1 may be determined by the equation $$\theta 1 = \begin{cases} \cos^{-1} m, & \text{if } y1 \geq y5 \\ 360° - \cos^{-1} m, & \text{if } y1 < y5 \end{cases}$$

$$\theta 2 = \theta 1 + 180°$$

where $$m = \begin{cases} \dfrac{x1 - x5}{r_{actual}}, & \text{if } -1 \leq \dfrac{x1 - x5}{r_{actual}} \leq 1 \\ -1, & \text{if } -1 > \dfrac{x1 - x5}{r_{actual}} \\ +1, & \text{if } 1 < \dfrac{x1 - x5}{r_{actual}} \end{cases}$$

To account for approximation, the term inside the inverse of Cosine is ceiled to a number between −1 to 1 if it is beyond the −1 to 1 range (e.g. if $$\dfrac{x1 - x5}{r_{actual}} = -1.1,$$

then the value is ceiled to −1, and if $$\dfrac{x1 - x5}{r_{actual}} = 1.1,$$

then the value is ceiled to 1).

The equation θ1=360°−Cos⁻¹ (m) may be used since Cos−1 returns a value between 0° to 180°, and for angles greater than 180° it can be determined by this equation.

With the initial angle data from the above equations (e.g., θ1 and θ2) the reference detent can be rotated by the corresponding angle (e.g., θ1 or θ2) to ensure the first touch location and the reference detent location centers align. Rotating the reference detent as described above may be referred to herein as auto-alignment of the reference detent.

The auto align feature could have a timer of its own where if the user's hand is removed from the location of the spin wheel widget GUI for more than a fixed time, the next touch event from user will trigger an auto align. The delay may be less than the delay beyond which the GUI may auto close (e.g., hide). The debouncing may be done for all touch events on the spin wheel widget.

The center of the spin wheel widget GUI may be determined by the controller. For hand-based input the location of the user touch for gesture may be used for the center of the spin wheel widget GUI and to command the spin wheel widget GUI to be displayed. As one example, if double tap is the gesture, then the first tap location can be used as the center (which may be referred to herein as having x coordinate x5 and y coordinate y5) for the spin wheel widget GUI.

For the com-wheel based on touch with align pins, the touch inputs may have the relationship r1+(tolerance r1)<r−(tolerance r), where r1, r, d and θ are pre-determined (e.g., stored in non-transitory memory) and may be used by the controller.

In the example shown, the distances may be compared and sorted into two tables. The distances may be calculated according to the equation $d12 = \sqrt{(x1-x2)^2 + (y1-y2)^2}$, where d12 is the distance between a first location and a second location along the touchscreen display, x1 and y1 are Cartesian coordinates associated with the first location along the touchscreen display (e.g., the location of a first touch input to the touchscreen display) and x2 and y2 are Cartesian coordinates associated with the second location along the touchscreen display (e.g., the location of a second touch input to the touchscreen display). A first table may have the distances that are within 2*(r±tolerance r), and a second table may have the distances that are within (d±tolerance d). In the two tables there will be one combination of distance that will not be shared. For example, there are two points that satisfy condition 2, but d23 has point 2 shared with condition 1's d12. Because of this, d23 point 2 cannot be an align pin based on the pre-determined relationships described above. Therefore, it may be determined that points 3 and 4 are the align pins and points 1 and 2 are the rotating pins. Now that we know points 1 and 2 are the rotating pins we can determine the center of the com-wheel with the equation $$(x5, y5) = \left(\left(\frac{x1 + x2}{2}\right), \left(\frac{y1 + y2}{2}\right)\right).$$

The actual radius detected may be calculated using the equation $$r_{actual} = \frac{d12}{2},$$

where d12 is the distance between points (x1,y1) and (x2, y2) and can be found using the Cartesian co-ordinates distance equation.

For hand-based input the actual radius can be calculated as $r_{actual}$=d15, where d15 is the distance between the hand touch point on the GUI and the location of the gesture which is the center (x5, y5) of the spin wheel widget which for hand-based input would be the location of the gesture.

Whether the spin wheel widget GUI is hand-based or com-wheel touch-based, the center may be identified. In this example, (x5, y5) represents the center of the spin wheel widget. The spin wheel widget GUI can be made a function of the center, where based on the location of the center (e.g., the location of spin wheel widget), the configuration of the GUI may be different. For example, in split screen mode, if the spin wheel widget GUI is triggered in a location in one screen, it may have a first configuration (e.g., the configuration shown by FIG. 3), and if the spin wheel widget is triggered in another screen location, then it may have a different, second configuration (e.g., the configuration shown by FIG. 4). Similarly, it could bring about different settings menu based on the location where it was triggered. For example, if triggering over one particular parameter like volume, the spin wheel widget GUI may have a configuration specific for volume. These GUIs may be displayed anywhere on screen based on real time screen usage.

Similar to the location-based spin wheel widget GUI, a gesture-based spin wheel widget GUI may be used, where different gestures bring about different spin wheel widget GUI configurations. For example, a double-tap gesture may display a spin wheel widget GUI with a first configuration and a triple-tap gesture may display a spin wheel widget GUI with a second configuration.

In some examples, com wheel construction parameters such as com wheel radius, align pin radius, number of pins (e.g., nibs), etc. may determine the configuration of the spin wheel widget GUI displayed responsive to coupling the com wheel to the touchscreen display. As one example, one com wheel having a first configuration may trigger display of a first spin wheel widget GUI having a first configuration, and another com wheel having a second configuration may trigger display of a second spin wheel widget GUI having a second configuration. In some examples, the different spin wheel widget GUIs may be displayed concurrently (e.g., while both com wheels are concurrently engaged with the touchscreen display). In some examples, two identical com wheels may trigger display of different spin wheel widget GUI configurations for different settings.

Figure 7:
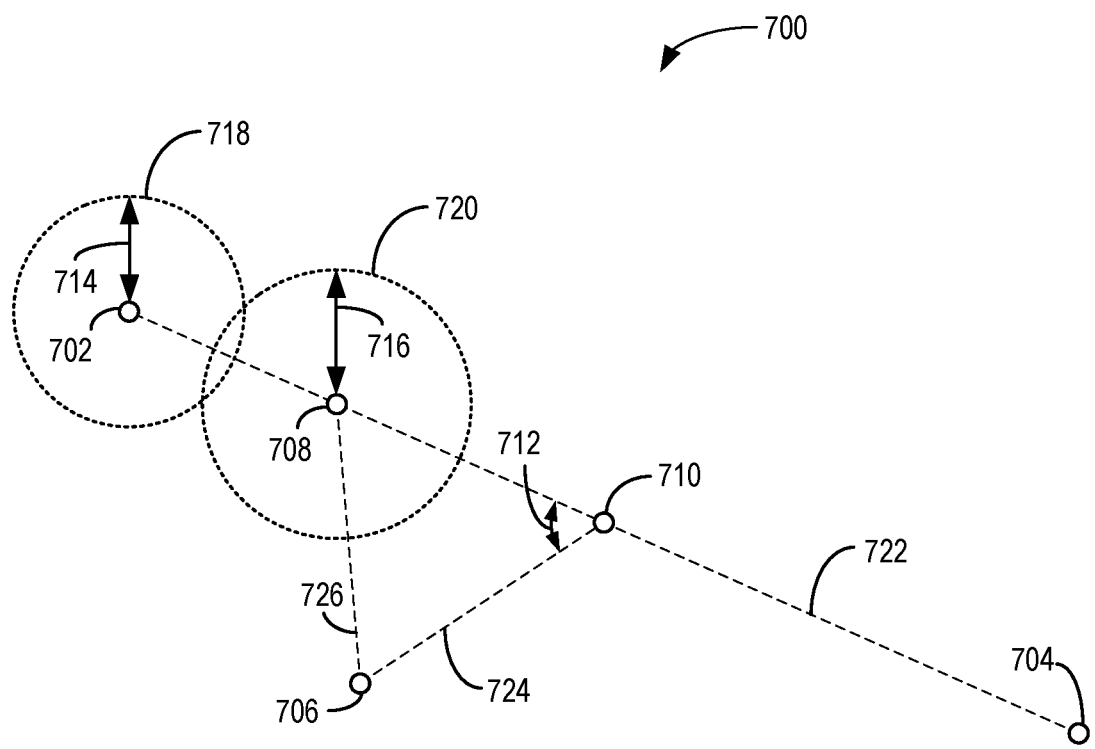
FIG. 7 shows a diagram illustrating another configuration of touch inputs detected by a touchscreen display.

Referring to FIG. 7, a diagram 700 illustrating another configuration of touch inputs detected by a touchscreen display is shown. The touchscreen display may be similar to, or the same as, the touchscreen display 102 described above with reference to FIGS. 1-2. The touchscreen display may be included by a touchscreen system, such as the touchscreen system 100 described above with reference to FIGS. 1-2. Components of the touchscreen system and/or touchscreen display described herein with reference to the example shown by FIG. 7 may be similar to, or the same as, the components similarly named and described above with reference to FIGS. 1-2, and may not be re-introduced.

In the configuration shown by FIG. 7, marker 702 indicates a location of the first touch input to the touchscreen display, marker 704 indicates the location of the second touch input to the touchscreen display, marker 706 indicates the location of the third touch input to the touchscreen display, and marker 708 indicates the location of the fourth touch input to the touchscreen display. Each of the touch inputs may be provided by the com wheel, as described above.

Center 710 is arranged at a midpoint between the marker 702 and the marker 704, with the center 710 indicating a location of the center of the com wheel as well as a location of a center of a spin wheel widget GUI to be displayed by the touchscreen display. Axis 722 extends between the marker 702 and the marker 704, with the center 710 arranged along the axis 722. Axis 726 extends between the marker 708 and the marker 706, and axis 724 extends between the marker 706 and the center 710. The axis 724 is angled relative to the axis 722 by angle 712. A first tolerance region 718 is shown surrounding the marker 702, and a second tolerance region 720 shown surrounding the marker 708. A radius 714 of the first tolerance region 718 is shown smaller than a radius 716 of the second tolerance region 720. In some examples, the radius of the second tolerance region 720 may be smaller than the radius of the first tolerance region 718.

In the configuration shown, r refers to a distance between marker 702 and center 710, r1 refers to a distance between center 710 and marker 708 or a distance between center 710 and marker 706, d refers to a distance between marker 708 and marker 706, and θ refers to angle 712. The maximum distance between an align point (alignment pin) and a rotating point (rotational pin) may be r1+r+(Tolerance r1)+ (Tolerance r). In this configuration, r1+(Tolerance r1) is less than r−(Tolerance r). Otherwise, a touch area (tolerance region) of a rotating nib (rotational pin) may occur in the touch area of an align nib (alignment pin) leading to the align nib being detected as a rotating nib, or vice versa.

Based on the above, r1+(tolerance r1)<r−(tolerance r) is a pre-determined relationship providing increased detection of the nibs and corresponding touch inputs applied by the nibs. Additionally, another pre-determined relationship is defined by d+(tolerance d)<2*(r−(tolerance r)).

With conditions of the above relationships satisfied, the nibs of the com wheel may be differentiated. For example, the points of a touch event may be measured (e.g., a distance and/or angle between each touch input may be calculated). The controller may detect four touch points (e.g., with each touch point indicated by a respective marker in FIG. 7, such as marker 702, marker 704, marker 706, and marker 708), and based on the touch points the controller may determine the distance of the four points in combinations of two using calculated Cartesian coordinate distance between two points. For example, if (x1, y1) and (x2, y2) are two points, then the distance equation may be d12= $\sqrt{(x1-x2)^2+(y1-y2)^2}$.

Using the above equation, the distance between the combination of two points among the recorded four points indicated by the markers as d12, d13, d14, d23, d24 and d34 may be determined. For example, d12 may refer to the distance between marker 702 and marker 704, d23 may refer to the distance between marker 704 and marker 708, etc.

For hand or stylus-based touch inputs, the location of the user touch in performing the gesture to command the electronic controller to display the spin wheel widget GUI may be the center. As one example, if the gesture is a double-tap, the location of the first tap (first touch input) can be used as the center for the spin wheel widget GUI.

During conditions in which the com wheel is coupled to the touchscreen display, the touch inputs may have the relationship r1+(tolerance r1)<r−(tolerance r), where r1, r, d and θ are pre-determined (e.g., stored in non-transitory memory) and may be used by the controller.

Referring to FIG. 8, a diagram 800 illustrating a detent orientation of a spin wheel widget GUI of a touchscreen display is shown. The touchscreen display may be similar to, or the same as, the touchscreen display 102 described above with reference to FIGS. 1-2. The touchscreen display may be included by a touchscreen system, such as the touchscreen system 100 described above with reference to FIGS. 1-2. Components of the touchscreen system and/or touchscreen display described herein with reference to the example shown by FIG. 8 may be similar to, or the same as, the components similarly named and described above with reference to FIGS. 1-2, and may not be re-introduced.

In the configuration shown by FIG. 8, a first marker 802 indicates a location of a first detent of a spin wheel widget GUI, a second marker 804 indicates a location of a second detent of a spin wheel widget GUI, and marker 806 is arranged horizontally between the first marker 802 and the second marker 804. Axis 810 extends between the first marker 802 and marker 814, and axis 812 extends between the marker 804 and marker 814, where marker 814 indicates a center of the spin wheel widget GUI. Axis 816 is arranged horizontally relative to the marker 814, and axis 809 extends between the marker 814 and the marker 806 in a vertical direction perpendicular to the axis 816. The axis 810 is angled relative to the axis 809 by angle 822, the axis 812 is angled relative to the axis 809 by angle 824, the axis 810 is angled relative to the axis 812 by angle 820, and the axis 810 is angled relative to axis 816 by angle 818.

In the configuration shown, marker 802 may represent the reference detent (e.g., detent zero), the next detent on clockwise direction is spaced apart by angle 820 (which may be referred to as θ3), and marker 804 may represent an adjacent detent (which may be referred to as 1'). During the transition around the circular path, the mid-point is at angle 822 from axis 810 and angle 824 from axis 812. The angle 822 and angle 824 may each be referred to as θ4. θ4 may also be the angle of the mid-point noise margin if dividing the detents at the mid-point with respect to symmetry. For a single point noise margin, the transition line is spaced apart by θ4 with respect to detent 1' and the center of the spin wheel widget GUI (with the center indicated by marker 814). A simple single detent transition point may be defined by θ4, or a dual area transition point may have dual noise margins with no touch zone in between. The two transition point detents provide that there is no overlap between the two areas. For example, if a circular area around the detents for allowed touch area is used, then its radius may be configured such that it is less than or equal to dNM/2 to prevent overlap, where dNM is the distance between marker 802 and marker 804 (e.g., length 808). A symmetrical area around a detent may increase performance.

The detent detection may work with equal noise margin along the Y axis (e.g., axis 809 shown by FIG. 8) and the X axis (e.g., the direction parallel with axis 816 from the point indicated by marker 806 between the inner perimeter 1004 and outer perimeter 1002, shown by FIG. 10), but in some implementations the noise margin may be varied.

Referring to FIG. 9, a diagram 900 illustrating a detent adjustment tolerance for a spin wheel widget GUI of a touchscreen display is shown. The touchscreen display may be similar to, or the same as, the touchscreen display 102 described above with reference to FIGS. 1-2. The touchscreen display may be included by a touchscreen system, such as the touchscreen system 100 described above with reference to FIGS. 1-2. Components of the touchscreen system and/or touchscreen display described herein with reference to the example shown by FIG. 9 may be similar to, or the same as, the components similarly named and described above with reference to FIGS. 1-2, and may not be re-introduced.

The configuration shown by FIG. 9 includes several of the features described above with reference to the configuration shown by FIG. 8, and the features in the configuration shown by FIG. 9 that are similar to, or the same as, the features in the configuration shown by FIG. 8 may not be re-introduced.

A first tolerance region 901 is shown surrounding the marker 802, where the first tolerance region 901 has a first radius 908. A second tolerance region 904 is also shown surrounding the marker 802, where the second tolerance region 904 has a second radius 910 larger than the first radius 908. A third tolerance region 902 is shown surrounding the marker 804, where the third tolerance region 902 has a third radius 912. A fourth tolerance region 906 is shown surrounding the marker 804, where the fourth tolerance region 906 has a fourth radius 914. In some examples, a length of the first radius 908 may be equal to a length of the third radius 912, and/or a length of the second radius 910 may be equal to a length of the fourth radius 914.

In the configuration shown, the tolerance regions are circular touch areas around the expected detent locations. During conditions in which a touch event moves from the first tolerance region to the second tolerance region, an adjustment of the selected detent may occur.

With respect to the tolerance regions, if a distance of the touch event location (which may have a coordinate of x6, y6) to the detent indicated by marker 802 (which may have a coordinate of x1, y1) is less than the radius of the circle (tolerance region) defined around detent, then the touch event is within the circle. The distance can be determined using the equation $d=\sqrt{(x1-x6)^2+(y1-y6)^2}$.

The tolerance region 904 and tolerance region 906 are shown overlapping, and the system may be configured such that the tolerance regions do not overlap. For example, configuring the tolerance region around each detent to have a radius greater than $d_{NM}/2$ may cause the tolerance regions to overlap. Instead, each tolerance region may be configured with a radius smaller than $d_{NM}/2$ to reduce a likelihood of overlapping.

With the above examples it is clear how detent changes can be detected and based on the direction of change the direction also can be detected.

Referring to FIG. 10, another diagram 1000 illustrating a detent adjustment tolerance for a spin wheel widget GUI of a touchscreen display is shown. The touchscreen display may be similar to, or the same as, the touchscreen display 102 described above with reference to FIGS. 1-2. The touchscreen display may be included by a touchscreen system, such as the touchscreen system 100 described above with reference to FIGS. 1-2. Components of the touchscreen system and/or touchscreen display described herein with reference to the example shown by FIG. 10 may be similar to, or the same as, the components similarly named and described above with reference to FIGS. 1-2, and may not be re-introduced.

The configuration shown by FIG. 10 includes several of the features described above with reference to configuration shown by FIG. 9, and the features in the configuration shown by FIG. 10 that are similar to, or the same as, the features in the configuration shown by FIG. 9 may not be re-introduced.

In the configuration shown by FIG. 10, the spin wheel widget GUI includes an outer perimeter 1002 and an inner perimeter 1004. Axis 1006 extends from the center 814 in a direction at an angle 1010 relative to the axis 810, and axis 1008 extends from the center 814 in a direction at angle 1012 relative to the axis 812. A location of a detent adjacent to the location of the detent indicated by marker 802 may be along axis 1006, and a location of a detent adjacent to the location of the detent indicated by marker 804 may be along axis 1008.

FIG. 10 shows an example with noise margins (tolerance regions) defined by the angles between the detents. In some examples, a dual noise margin may be preferred over the single noise margin to reduce a likelihood of undesired toggling between the detents.

Referring to FIG. 11, another diagram 1100 illustrating a detent adjustment tolerance for a spin wheel widget GUI of a touchscreen display is shown. The touchscreen display may be similar to, or the same as, the touchscreen display 102 described above with reference to FIGS. 1-2. The touchscreen display may be included by a touchscreen system, such as the touchscreen system 100 described above with reference to FIGS. 1-2. Components of the touchscreen system and/or touchscreen display described herein with reference to the example shown by FIG. 11 may be similar to, or the same as, the components similarly named and described above with reference to FIGS. 1-2, and may not be re-introduced.

The configuration shown by FIG. 11 includes several of the features described above with reference to FIG. 8, and the features in the configuration shown by FIG. 8 that are similar to, or the same as, the features in the configuration shown by FIG. 11 may not be re-introduced.

The spin wheel widget GUI shown by FIG. 11 includes an outer perimeter 1102 and an inner perimeter 1104. FIG. 11 additionally shows axis 1110 extending between the center 814 and the marker 802, and axis 1120 extending between the center 814 and the marker 804. FIG. 11 additionally shows axis 1106 extending from the center 814 at an angle 1108 relative to the axis 1110, axis 1112 extending from the center 814 at an angle 1114 relative to the axis 1110, axis 1116 extending from the center 814 at an angle 1118 relative to the axis 1120, and axis 1124 extending from the center 814 at an angle 1122 relative to the axis 1120.

In the configuration shown, angle 1108, angle 1114, angle 1118, and angle 1122 may each be smaller than each of angle 1010, angle 822, angle 824, and angle 1012 described above with reference to FIG. 10 to reduce a likelihood of overlapping of tolerance regions.

The configuration shown by FIG. 11 includes dual noise margins (tolerance regions). For example, when a touch event moves from the region between axis 1106 and axis 1112 to the region between axis 1116 and axis 1124 (bounded by inner perimeter 1104 and outer perimeter 1102), the touch event may trigger a change in detent selection. However, moving the touch event from the region between axis 1106 and axis 1112 to the region between axis 1112 and axis 1116 may not trigger the change in detent selection.

If the touch event has a distance from the center (which may have an x and y coordinate of x6 and y6, respectively, in the example shown by FIG. 11) greater than a radius of the inner perimeter 1104 but less than a radius of the outer perimeter 1102, and if an angle between the touch event and the center is between $\theta1 \pm \theta5$ (where $\theta1$ refers to angle 818 and $\theta5$ refers to one of angle 1108, angle 1114, angle 1118, or angle 1122), then the touch event is within the acceptable area to transition the selection of the detent. As one example, the distance can be determined using $d = \sqrt{(x1-x6)^2 + (y1-y6)^2}$ (where the x and y coordinate of marker 802 is x1 and y1, respectively, and x6 and y6 refer to the x and y coordinate, respectively, of the center indicated by marker 814), and angles can be determined using the equations $$\theta1 = \begin{cases} \cos^{-1} m, & \text{if } y1 \geq y6 \\ 360° - \cos^{-1} m, & \text{if } y1 < y6 \end{cases}$$

where $$m = \begin{cases} \frac{x1-x6}{r_{actual}}, & \text{if } -1 \leq \frac{x1-x6}{r_{actual}} \leq 1 \\ -1, & \text{if } -1 > \frac{x1-x6}{r_{actual}} \\ +1, & \text{if } 1 < \frac{x1-x6}{r_{actual}} \end{cases},$$

and where the labeling of the x and y coordinates of the touch inputs, etc. may be similar to that described above with reference to FIG. 6.

Figure 12:
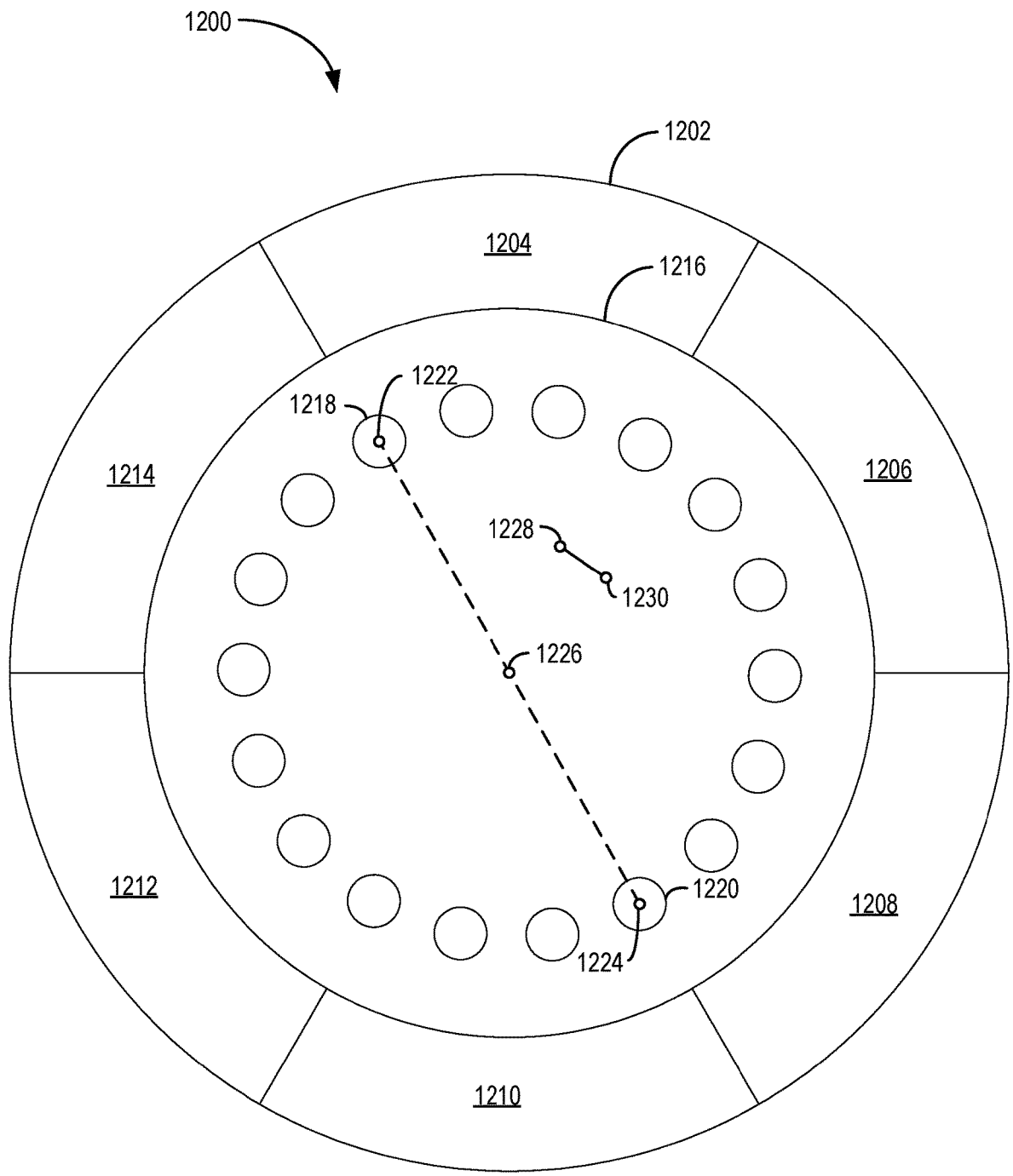
FIG. 12 shows another spin wheel widget that may be displayed by a touchscreen display.

Referring to FIG. 12, another spin wheel widget that may be displayed by a touchscreen display is shown. The touchscreen display may be similar to, or the same as, the touchscreen display 102 described above with reference to FIGS. 1-2. The touchscreen display may be included by a touchscreen system, such as the touchscreen system 100 described above with reference to FIGS. 1-2. Components of the touchscreen system and/or touchscreen display described herein with reference to the example shown by FIG. 12 may be similar to, or the same as, the components similarly named and described above with reference to FIGS. 1-2, and may not be re-introduced.

The spin wheel widget GUI 1200 shown by FIG. 12 includes an outer perimeter 1202 and an inner perimeter 1216 enclosing a plurality of outer sections, such as first outer section 1204, second outer section 1206, third outer section 1208, fourth outer section 1210, fifth outer section 1212, and sixth outer section 1214. The spin wheel widget GUI 1200 additionally includes a plurality of inner sections, which may be referred to herein as detents, such as detent 1218 and detent 1220 arranged opposite to each other across center 1226. A first marker 1222 indicates a location of a first touch input to the touchscreen applied to command the touchscreen to display the spin wheel widget GUI 1200, and a second touch input is indicated by second marker 1224. A third touch input is indicated by marker 1228 and a fourth touch input is indicated by marker 1230. Each of the touch inputs may correspond to respective pins of a com wheel engaged with the touchscreen display, such as the com wheel 104 described above with reference to FIGS. 1-2. In the example shown, each of the detents of the spin wheel widget GUI 1200 has a circular shape, and the respective tolerance region associated with each detent may be sized according to the size of the detent.

Figure 13:
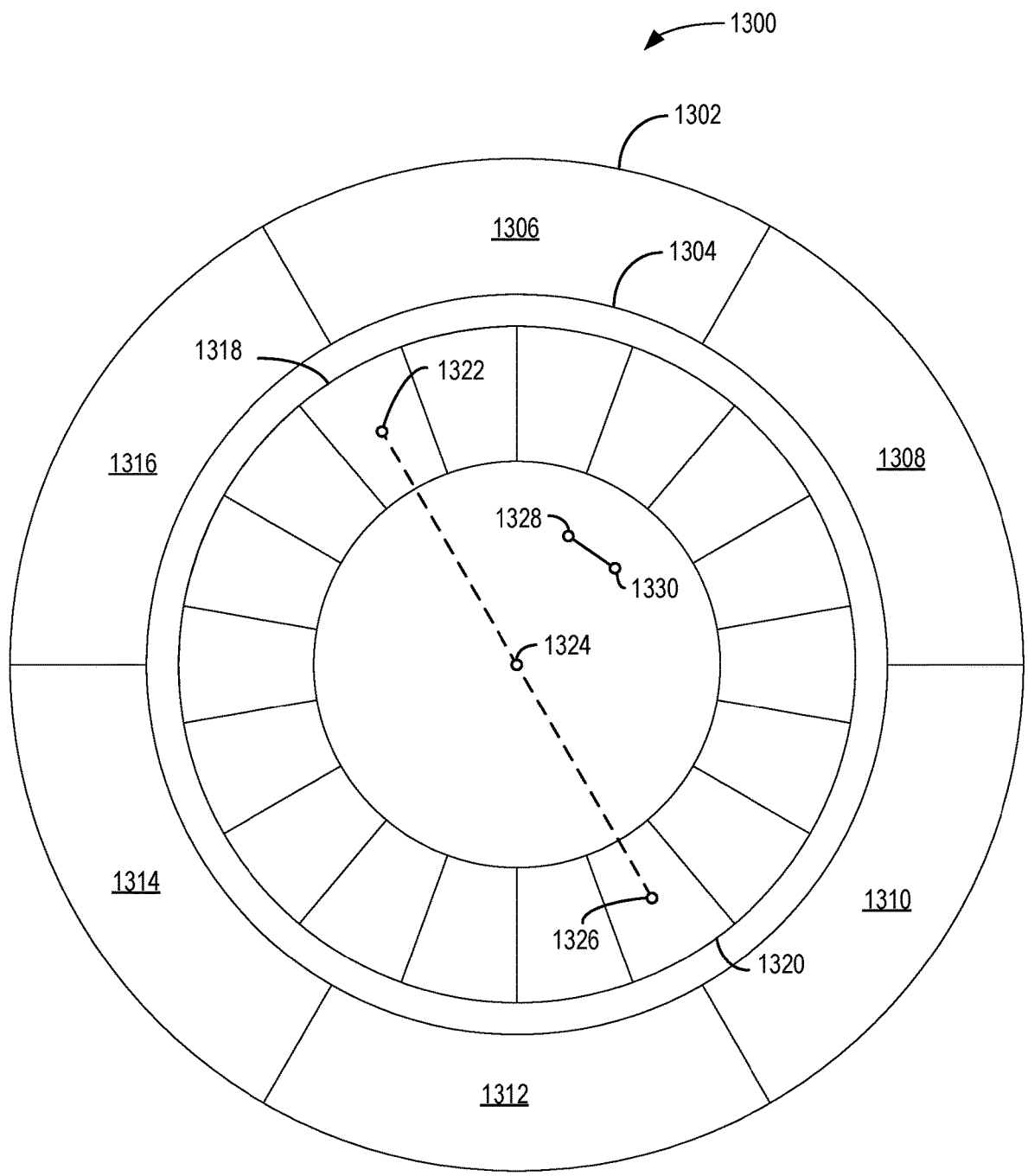
FIG. 13 shows another spin wheel widget that may be displayed by a touchscreen display.

Referring to FIG. 13, another spin wheel widget that may be displayed by a touchscreen display is shown. The touchscreen display may be similar to, or the same as, the touchscreen display 102 described above with reference to FIGS. 1-2. The touchscreen display may be included by a touchscreen system, such as the touchscreen system 100 described above with reference to FIGS. 1-2. Components of the touchscreen system and/or touchscreen display described herein with reference to the example shown by FIG. 13 may be similar to, or the same as, the components similarly named and described above with reference to FIGS. 1-2, and may not be re-introduced.

The spin wheel widget GUI 1300 shown by FIG. 13 includes an outer perimeter 1302 and an inner perimeter 1304 enclosing a plurality of outer sections, such as first outer section 1306, second outer section 1308, third outer section 1310, fourth outer section 1312, fifth outer section 1314, and sixth outer section 1316. Similar to the examples described above, the spin wheel widget 1300 includes a plurality of inner sections that may be referred to herein as detents, such as detent 1318 arranged at a location of a first touch input indicated by marker 1322 and detent 1320 arranged across from the detent 1318 at a location of a second touch input indicated by marker 1326. A center 1324 of the spin wheel widget GUI 1300 is arranged between the first touch input and the second touch input. A location of a third touch input is indicated by marker 1328, and a location of a fourth touch input is indicated by marker 1330. Each of the touch inputs may correspond to respective pins of a com wheel engaged with the touchscreen display, such as the com wheel 104 described above with reference to FIGS. 1-2. In the example shown, each of the detents of the spin wheel widget GUI 1300 has a wedge shape, and the respective tolerance region associated with each detent may be sized according to the size of the detent. As one example, the tolerance region of each detent may have a wedge shape matching the wedge shape of the detents, where the tolerance region of each detent may be larger than the detent.

The spin wheel widget GUI may provide haptic feedback, where for each detent change there is haptic feedback, increasing the user experience.

For the spin-wheel widget GUI to provide the user with a centralized GUI, the selection items may be displayed where the spin wheel GUI is around the physical com-wheel, increasing a user friendliness of the GUI.

Once the spin-wheel use case is concluded the user could use the enter key on the spin wheel widget to accept those changes and wait for the timeout delay for the spin-wheel widget GUI to auto close. Or, if the user wants to close the GUI accepting settings input via the GUI, the user can stop using the spin-wheel GUI and after the timeout the GUI may auto close. In the event of not accepting the final settings, the last setting window used (e.g., screen/setting/parameter) may be retained in memory until power off to ensure if the user re-opens the spin wheel widget GUI it starts from that setting.

Figure 14:
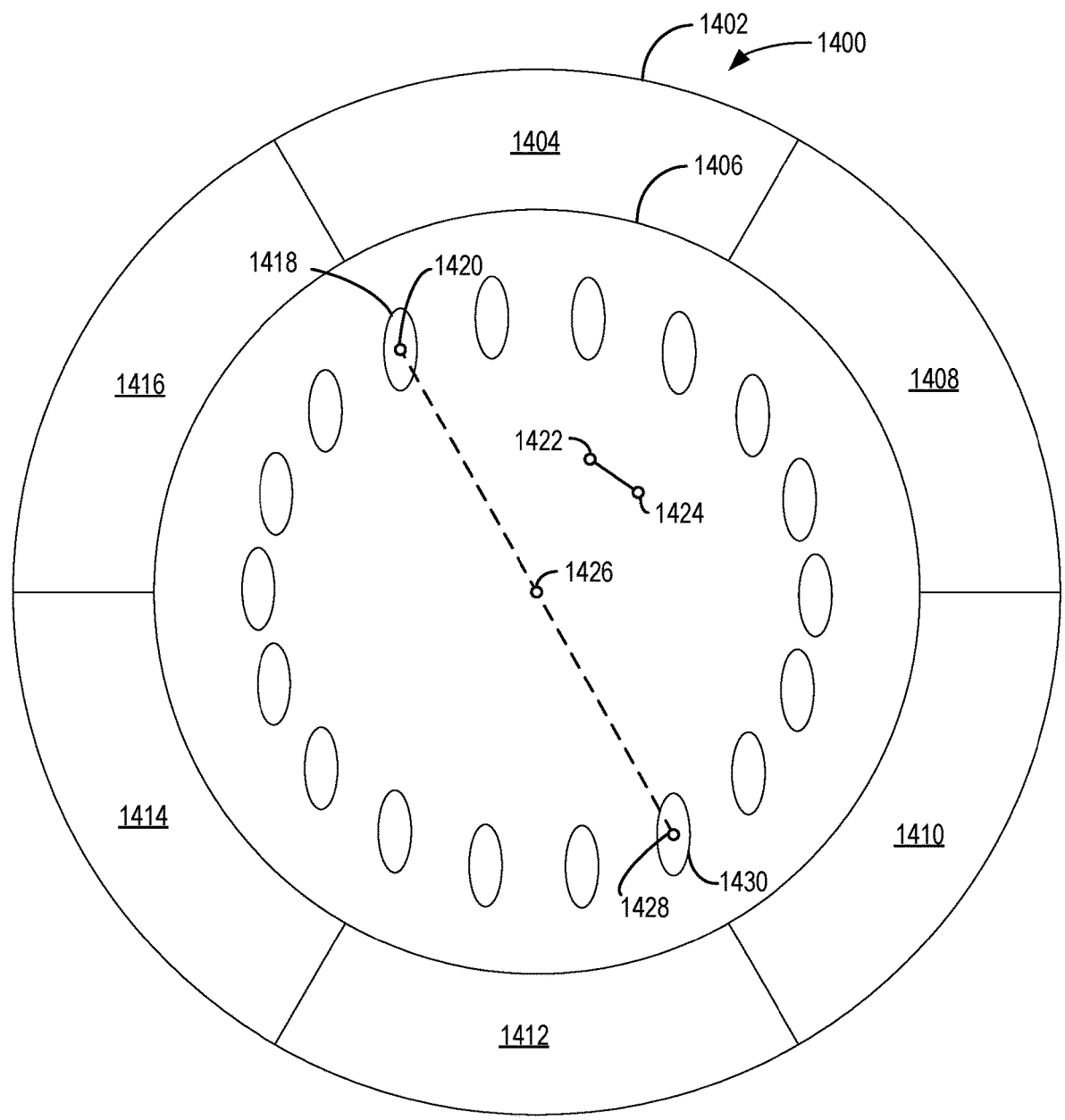
FIG. 14 shows another spin wheel widget that may be displayed by a touchscreen display.

Referring to FIG. 14, another spin wheel widget that may be displayed by a touchscreen display is shown. The touchscreen display may be similar to, or the same as, the touchscreen display 102 described above with reference to FIGS. 1-2. The touchscreen display may be included by a touchscreen system, such as the touchscreen system 100 described above with reference to FIGS. 1-2. Components of the touchscreen system and/or touchscreen display described herein with reference to the example shown by FIG. 14 may be similar to, or the same as, the components similarly named and described above with reference to FIGS. 1-2, and may not be re-introduced.

The spin wheel widget GUI 1400 shown by FIG. 14 includes an outer perimeter 1402 and an inner perimeter 1406 enclosing a plurality of outer sections, such as first outer section 1404, second outer section 1408, third outer section 1410, fourth outer section 1412, fifth outer section 1414, and sixth outer section 1416. Similar to the examples described above, the spin wheel widget GUI 1400 includes a plurality of inner sections that may be referred to herein as detents, such as detent 1418 arranged at a location of a first touch input indicated by marker 1420 and detent 1430 arranged across from the first detent 1418 at a location of a second touch input indicated by marker 1428. A center 1426 of the spin wheel widget GUI 1400 is arranged between the first touch input and the second touch input. A location of a third touch input is indicated by marker 1422, and a location of a fourth touch input is indicated by marker 1424. Each of the touch inputs may correspond to respective pins of a com wheel engaged with the touchscreen display, such as the com wheel 104 described above with reference to FIGS. 1-2. In the example shown, each of the detents of the spin wheel widget GUI 1400 has an oblong shape, and the respective tolerance region associated with each detent may be sized according to the size of the detent. As one example, the tolerance region of each detent may have an oblong shape matching the oblong shape of the detents, where the tolerance region of each detent may be larger than the detent.

Figure 15:
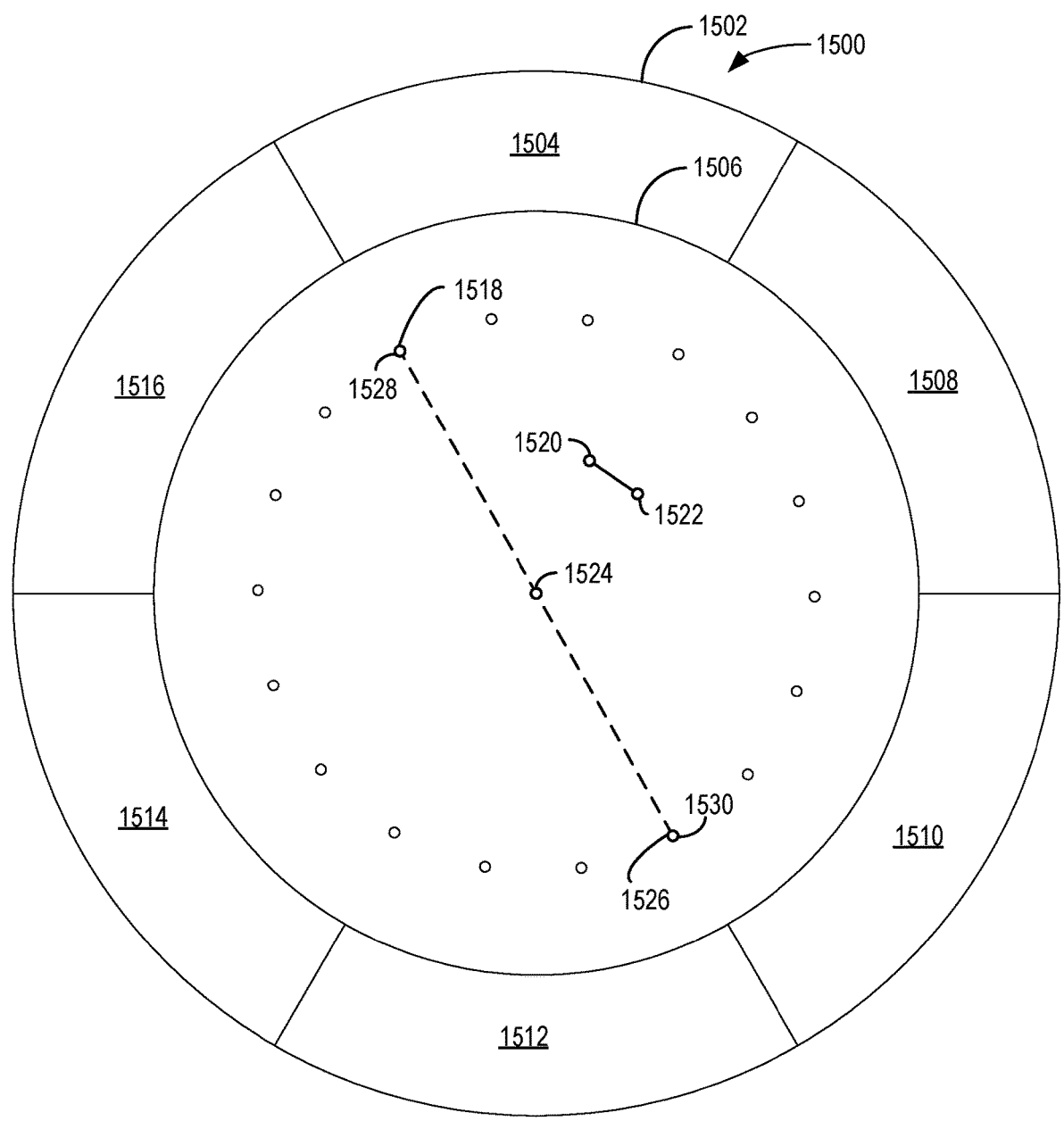
FIG. 15 shows another spin wheel widget that may be displayed by a touchscreen display.

Referring to FIG. 15, another spin wheel widget that may be displayed by a touchscreen display is shown. The touchscreen display may be similar to, or the same as, the touchscreen display 102 described above with reference to FIGS. 1-2. The touchscreen display may be included by a touchscreen system, such as the touchscreen system 100 described above with reference to FIGS. 1-2. Components of the touchscreen system and/or touchscreen display described herein with reference to the example shown by FIG. 15 may be similar to, or the same as, the components similarly named and described above with reference to FIGS. 1-2, and may not be re-introduced.

The spin wheel widget GUI 1500 shown by FIG. 15 includes an outer perimeter 1502 and an inner perimeter 1506 enclosing a plurality of outer sections, such as first outer section 1504, second outer section 1508, third outer section 1510, fourth outer section 1512, fifth outer section 1514, and sixth outer section 1516. Similar to the examples described above, the spin wheel widget GUI 1500 includes a plurality of inner sections that may be referred to herein as detents, such as detent 1518 arranged at a location of a first touch input indicated by marker 1528 and detent 1530 arranged across from the detent 1518 at a location of a second touch input indicated by marker 1526. A center 1524 of the spin wheel widget GUI 1500 is arranged between the first touch input and the second touch input. A location of a third touch input is indicated by marker 1520, and a location of a fourth touch input is indicated by marker 1522. Each of the touch inputs may correspond to respective pins of a com wheel engaged with the touchscreen display, such as the com wheel 104 described above with reference to FIGS. 1-2. In the example shown, each of the detents of the spin wheel widget GUI 1500 has a small circular shape, and the respective tolerance region associated with each detent may be sized according to the size of the detent. As one example, the tolerance region of each detent may have a larger circular shape matching the circular shape of the detents.

Figure 16:
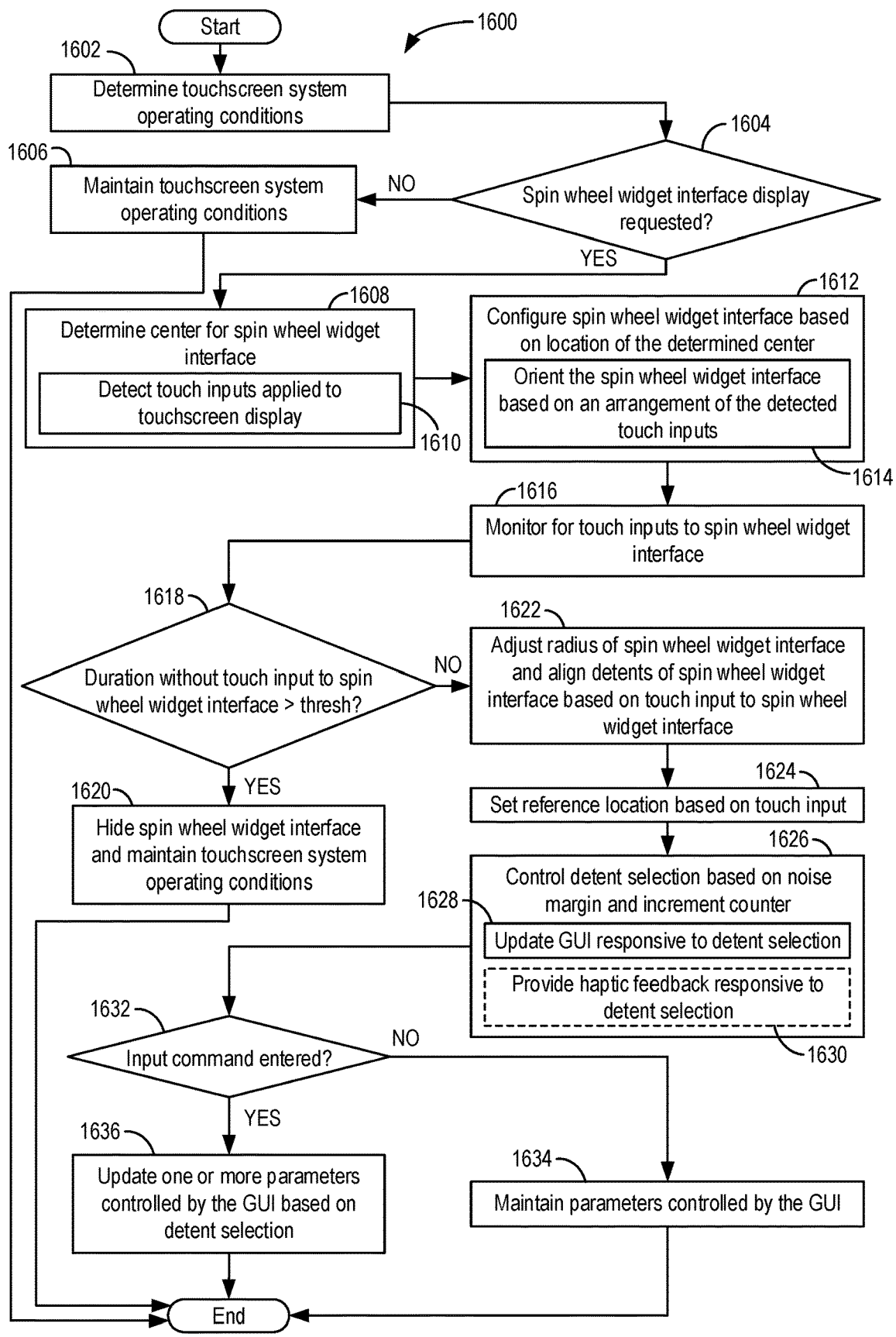
FIG. 16 shows a flow chart illustrating a method for a spin wheel widget GUI of a touchscreen display.

Referring to FIG. 16, a flow chart illustrating a method 1600 for a spin wheel widget GUI of a touchscreen display is shown. In some examples, the touchscreen display may be similar to, or the same as, the touchscreen display 102 described above with reference to FIGS. 1-2. The touchscreen display may be included by a touchscreen system, such as the touchscreen system 100 described above with reference to FIGS. 1-2. Components of the touchscreen system and/or touchscreen display described herein with reference to FIG. 16 may be similar to, or the same as, the components similarly named and described above with reference to FIGS. 1-2, and may not be re-introduced. Instructions for carrying out method 1600 and the rest of the methods included herein may be executed by a controller (which may be referred to herein as a control device) based on instructions stored on a memory of the controller and in conjunction with signals received from sensors and/or other components of the touchscreen system, such as the components described above with reference to FIG. 1. The controller may employ actuators of the touchscreen system to adjust touchscreen system operation, according to the methods described below. For example, providing haptic feedback via a touchscreen display of the touchscreen system may include energizing one or more motors/actuators within the touchscreen display.

At 1602, the method includes determining touchscreen system operating conditions. Determining the touchscreen system operating conditions may include determining a configuration of one or more GUI features displayed by the touchscreen display, an energization of one or more motors/actuators disposed within the touchscreen display, a number and/or arrangement of touch inputs applied to the touchscreen display, etc.

The method continues from 1602 to 1604 where the method includes determining whether spin wheel widget interface display is requested. Determining whether display of the spin wheel widget interface is requested at 1604 may include determining whether touch inputs have been applied to the touchscreen display. For example, during conditions in which touch inputs are applied to the touchscreen display, the controller may determine whether the touch inputs match a touch input signature stored in a memory of the controller. The touch input signature may be a pre-determined arrangement and/or sequence of touch inputs configured to indicate to the controller that the display of the spin wheel widget interface is requested. The spin wheel widget interface may be referred to herein as a spin wheel widget graphical user interface.

If displaying the spin wheel widget is not requested at 1604, the method continues from 1604 to 1606 where the method includes maintaining touchscreen system operating conditions. Maintaining touchscreen system operating conditions may include not updating the graphical user interface features displayed by the touchscreen display to include the spin wheel widget graphical user interface. For example, the controller may determine at 1604 that touch inputs have been applied to the touchscreen display but the touch inputs do not match the touch input signature stored in the memory of the controller. As a result, the controller may determine that the display of the spin wheel widget interface is not requested, and the controller may not command the display of the spin wheel widget graphical user interface via the touchscreen display.

However, if displaying the spin wheel widget is requested at 1604, the method continues from 1604 to 1608 where the method includes determining a center for the spin wheel widget interface. Determining the center for the spin wheel widget graphical user interface may include calculating one or more lengths inner angles between touch inputs applied to the touchscreen display, similar to the examples described above (e.g., the examples described with reference to FIGS. 6-7). For example, the center of the spin wheel which a graphical user interface may be determined based on a touch input signature applied to the touchscreen interface by a com wheel (e.g., com wheel 104 described above with reference to FIGS. 1-2), according to the examples described above.

Determining the center for the spin wheel widget interface at 1608 includes, at 1610, detecting touch inputs applied to the touchscreen display. Detecting the touch inputs applied to the touchscreen display may include determining a position of the touch inputs along the touchscreen display, determining a number of the touch inputs, determining a relative arrangement of the touch inputs, determining the lengths and/or angles between the touch inputs, etc.

The method continues from 1608 to 1612 where the method includes configuring the spin wheel widget interface based on the location of the determined center. Configuring the spin wheel widget graphical user interface based on the location of the determined center may include determining a number of detents included by the spin wheel widget graphical user interface, a size and/or shape of the detents, a spacing between the detents, a number of outer sections included by the spin wheel widget graphical user interface, a number of panels included by the spin wheel widget graphical user interface, etc., and displaying the spin wheel widget graphical user interface via the touchscreen display. As described above, in some examples, the configuration of the spin wheel widget graphical user interface may be based on the location of their touchscreen display at which the touch inputs are applied to command the touchscreen display to display the spin wheel widget graphical user interface. For example, during conditions in which the center of the spin wheel widget graphical user interface is arranged at a first section of a touch-sensitive surface of the touchscreen display, the spin wheel widget graphical user interface may have a first configuration, and during conditions in which the center of the spin wheel widget graphical user interface is arranged at a second section of the touch-sensitive surface of the touchscreen display, the spin wheel widget graphical user interface may have a second configuration.

Configuring the spin wheel widget interface based on the location of the determined center includes, at 1614, orienting the spin wheel widget interface based on an arrangement of the detected touch inputs. Orienting the spin wheel widget GUI based on the arrangement of the detected touch inputs may include setting a detent of the spin wheel widget GUI as a reference detent, similar to the examples described above. The other detents of the spin wheel widget GUI may be oriented relative to the reference detent, where the position of the reference detent may correspond to a touch input applied to the touchscreen display by the rotational pin of a com wheel, in some examples. In other examples, the reference detent may be positioned according to the gesture (e.g., touch input signature) applied to the touchscreen display by the user via a stylus and/or the fingers of the user.

The method continues from 1614 to 1616 where the method includes monitoring for touch inputs to the spin wheel widget interface. Monitoring for touch inputs to the spin wheel widget GUI may include sensing whether additional touch inputs have been applied to the touchscreen display following the display of the spin wheel widget GUI. In some examples, monitoring for touch inputs to the spin wheel widget GUI may include determining whether movement of touch inputs applied to the touchscreen display is detected. For example, during conditions in which a com wheel is coupled to the touchscreen display and the controller displays the spin wheel widget GUI at the location of the com wheel, the user may rotate the com wheel in order to interact with the spin wheel widget GUI. Rotating the com wheel may move the pins of the com wheel across the touchscreen display, and the controller may sense the movement of the pins along the touchscreen display and update the spin wheel widget GUI accordingly (e.g., adjust a detent selection of the spin wheel widget GUI, adjust one or more parameters controlled by the spin wheel widget GUI, etc.).

The method continues from 1616 to 1618 where the method includes determining whether a duration without touch input to the spin wheel widget interface is greater than a threshold duration. In some examples, the threshold duration may be 30 seconds, 1 minute, 2 minutes, etc. The threshold duration may be a user-defined and/or user-editable parameter of the spin wheel widget graphical user interface. For example, the user may adjust the threshold duration according to the user's preference.

If the duration without touch input to the spin wheel widget interface is greater than the threshold duration at 1618, the method continues from 1618 to 1620 where the method includes hiding the spin wheel widget interface and maintaining touchscreen system operating conditions. Hiding the spin wheel widget GUI and maintaining touchscreen system operating conditions may include removing the display of the spin wheel widget GUI from the touchscreen display. In some examples, the controller may maintain the settings of the spin wheel widget GUI in memory, and following a subsequent display of the spin wheel widget GUI, the controller may restore the settings of the spin wheel widget GUI to the settings that were in use prior to the hiding of the spin wheel widget GUI.

However, if the duration without touch input to the spin wheel widget interface is not greater than the threshold duration at 1618, the method continues from 1618 to 1622 where the method includes adjusting a radius of the spin wheel widget interface and aligning detents of the spin wheel widget interface based on touch input applied to the spin wheel widget interface. Adjusting the radius of the spin wheel widget GUI and aligning the detents of the spin wheel widget GUI based on the touch input to the spin wheel widget GUI include increasing or decreasing the size of the spin wheel widget GUI based on the touch input signature applied to the touchscreen display by the user and/or com wheel. In some examples, the user may adjust the position of the spin wheel widget GUI along the touchscreen display by moving com wheel along the touchscreen display and/or applying the touch signature to a different location of the touchscreen display. As a result, the controller may adjust the alignment of the detents of the spin wheel widget GUI based on the updated location of the spin wheel widget GUI.

The method continues from 1622 to 1624 where the method includes setting a reference location based on touch input. Setting the reference location based on the touch input may include updating the reference detent of the spin wheel widget GUI based on the touch input. For example, during conditions in which the user performs a touch input to indicate that re-positioning of the spin wheel widget GUI is desired, the controller may update the reference detent based on the touch input applied by the user (e.g., via a stylus, finger, or com wheel).

The method continues from 1624 to 1626 where the method includes controlling detent selection based on a noise margin and increment counter. Controlling detent selection based on the noise margin and increment counter may include monitoring touch inputs applied to the touchscreen display and adjusting the selected detent of the spin wheel widget GUI responsive to the touch inputs. The spin wheel widget GUI may include a respective tolerance region for each detent, similar to the examples described above, and the adjustment of the detent selection may include determining whether the touch inputs applied to the touchscreen display are within the tolerance regions. For example, during conditions in which the reference detent is selected, the user may apply a touch input to a tolerance region of a detent adjacent to the reference detent in order to adjust the selected detent to the adjacent detent (e.g., from the reference detent). However, if the touch input is not within the tolerance region, the adjustment of the selected detent may not be performed (e.g., the selection of the detent may not change from the reference detent to the adjacent detent). Adjustment of the detent and the tolerance regions may be similar to the examples described above with reference to FIGS. 8-11.

Controlling the detent selection based on the noise margin and increment counter at 1626 includes, at 1628, updating the GUI responsive to detent selection. Updating the spin wheel widget GUI responsive to the detent selection may include highlighting the selected detent via a color change, overlay, pattern change, etc. In some examples, the detents of the spin wheel widget GUI may rotate around the center of the spin wheel widget GUI responsive to adjusting the detent selection.

Controlling the detent selection based on the noise margin and increment counter at 1626 may include, at 1630, providing haptic feedback responsive to detent selection. Providing haptic feedback responsive to the detent selection may include energizing one or more motors/actuators included by the touchscreen display in order to provide a vibration or other sensory stimulus at the location of the selected detent and/or reference detent.

The method continues from 1630 to 1632 where the method includes determining whether an input command has been entered. Determining whether the input command has been entered may include determining whether the com wheel has been pressed against the touchscreen display by the user and/or whether the user has entered the input command via direct touch to the touchscreen display via a stylus or the user's finger. For example, during conditions in which the com wheel is coupled to the touchscreen display, the user may press the com wheel towards attachments display in order to engage additional pins of the com wheel with the touchscreen display. The controller may detect the additional touch inputs applied by the additional pins of the com wheel and may determine that the input command has been entered as a result. Entering the input command may be similar to pressing the enter key of a user interface device such as a keyboard in order to confirm parameters that have been entered into the GUI or adjusted by the GUI displayed by the touchscreen display.

If an input command has not been entered at 1632, the method continues from 1632 to 1634 where the method includes maintaining parameters controlled by the GUI. Maintaining the parameters controlled by the GUI may include not confirming or entering (e.g., storing into computer storage) parameters that have been temporarily adjusted by the user via the spin wheel widget GUI. As one example, the user may interact with the spin wheel widget GUI in order to adjust numerical values of data displayed by the touchscreen display, such as medical patient information. Maintaining the parameters at 1634 may include not altering the parameters stored in the computer storage based on the adjustments performed by the user via the spin wheel widget GUI (e.g., discarding temporary adjustment of the parameters performed by a user via the spin wheel widget GUI).

However, if an input command has been entered at 1632, the method continues from 1632 to 1636 where the method includes updating one or more parameters controlled by the GUI based on detent selection. Updating the one or more parameters controlled by the GUI based on the detent selection may include storing updated parameters to computer storage based on the user interaction with the spin wheel widget GUI. For example, in order to adjust a numerical value of data displayed by the touchscreen display via the spin wheel widget GUI, the user may interact with the spin wheel widget GUI via touch inputs applied by a stylus or finger of the user or a com wheel coupled to the touchscreen display to increase or decrease the numerical value of the data. As one example, increasing a numerical value may include applying touch inputs to rotate selection of the detent of the spin wheel widget GUI in a clockwise direction, and decreasing the numerical value may include applying touch inputs to rotate selection of the detent of the spin wheel widget GUI in a counter-clockwise direction. The increased or decreased numerical value may be stored to the computer memory responsive to the determination that the input command has been entered at 1632, and the spin wheel widget GUI may be updated to reflect the adjusted numerical value of the data (e.g., the numerical value may be displayed by the spin wheel widget GUI, and appearance of the spin wheel widget GUI may be updated to indicate that the adjusted numerical value has been stored to computer storage).

The technical effect of configuring the spin widget to display responsive to touch input is to provide the user with a location-based user interface.

In one embodiment, a method comprises: detecting touch inputs applied to a touchscreen display; and responsive to detecting the touch inputs, outputting a graphical user interface (GUI) to the touchscreen display and orienting the GUI based on an arrangement of the touch inputs. In a first example of the method, the method further includes determining a source of the touch inputs applied to the touchscreen display based on the arrangement of the touch inputs; and configuring a parameter of the GUI based on the source of the touch inputs. A second example of the method optionally includes the first example, and further includes wherein the parameter includes a diameter of the GUI, a number of detents of the GUI, or a rotational position of a reference detent of the GUI. A third example of the method optionally includes one or both of the first and second examples, and further includes wherein detecting the touch inputs includes detecting a first touch input and a second touch input applied concurrently to the touchscreen display. A fourth example of the method optionally includes one or more or each of the first through third examples, and further includes wherein a length between a location of the first touch input and a location of the second touch input is between 0.2 millimeters and 1.0 millimeters. A fifth example of the method optionally includes one or more or each of the first through fourth examples, and further includes wherein the touch inputs include a sequence of at least two touch inputs, with a duration between each touch input in the sequence being between 0.2 and 0.75 seconds. A sixth example of the method optionally includes one or more or each of the first through fifth examples, and further includes wherein the GUI is a spin wheel widget including a plurality of detents. A seventh example of the method optionally includes one or more or each of the first through sixth examples, and further includes wherein an arrangement and/or number of the detents is based on a location of the touch inputs along the touchscreen display. An eighth example of the method optionally includes one or more or each of the first through seventh examples, and further includes wherein the spin wheel widget is centered based on a location of the touch inputs. A ninth example of the method optionally includes one or more or each of the first through eighth examples, and further includes wherein a reference detent of the plurality of detents is oriented based on the arrangement of the touch inputs. A tenth example of the method optionally includes one or more or each of the first through ninth examples, and further includes wherein each detent of the plurality of detents is oriented around a center of the spin wheel widget based on the orientation of the reference detent. An eleventh example of the method optionally includes one or more or each of the first through tenth examples, and further includes generating a plurality of selection margins including a respective selection margin for each detent of the plurality of detents, where applying a touch input to a portion of the touchscreen display defined by a selection margin of the plurality of selection margins selects a corresponding detent of the plurality of detents. A twelfth example of the method optionally includes one or more or each of the first through eleventh examples, and further includes wherein a diameter of the GUI is based on the arrangement of the touch inputs. A thirteenth example of the method optionally includes one or more or each of the first through twelfth examples, and further includes wherein outputting the GUI to the touchscreen display includes displaying a plurality of detents centered annularly around a location of the touch inputs. A fourteenth example of the method optionally includes one or more or each of the first through thirteenth examples, and further includes wherein orienting the GUI based on the arrangement of the touch inputs includes defining a reference detent from the plurality of detents based on an angle and/or length between the touch inputs and adjusting a rotational position of the plurality of detents based on the reference detent. A fifteenth example of the method optionally includes one or more or each of the first through fourteenth examples, and further includes: responsive to defining the reference detent, setting the reference detent as a selected detent; and adjusting the selected detent from the reference detent to an adjacent detent of the plurality of detents. A sixteenth example of the method optionally includes one or more or each of the first through fifteenth examples, and further includes: responsive to adjusting the selected detent from the reference detent to the adjacent detent of the plurality of detents, providing haptic feedback via the touchscreen display at the location of the reference detent and/or adjacent detent. A seventeenth example of the method optionally includes one or more or each of the first through sixteenth examples, and further includes hiding the GUI responsive to a duration without a touch input applied to the touchscreen display being greater than a threshold duration.

In another embodiment, a method comprises: determining a location of a touch input signature applied along a touch-sensitive surface of a touchscreen display; and responsive to determining the location of the touch input signature: outputting a first graphical user interface (GUI) to the touchscreen display at the location of the touch input signature if the touch input signature is within a first section of the touch-sensitive surface; and outputting a second GUI to the touchscreen display at the location of the touch input signature if the touch input signature is outside of the first section. In a first example of the method, the first GUI is a first spin wheel widget including a first plurality of detents and the second GUI is a second spin wheel widget including a second plurality of detents. A second example of the method optionally includes the first example, and further includes transitioning from outputting the first GUI to outputting the second GUI responsive to adjusting the location of the touch input signature from within the first section to outside of the first section, or transitioning from outputting the second GUI to outputting the first GUI responsive to adjusting the location of the touch input signature from outside of the first section to within the first section. A third example of the method optionally includes one or both of the first and second examples, and further includes wherein one of the first GUI or the second GUI includes at least one panel not included by the other of the first GUI or the second GUI. A fourth example of the method optionally includes one or more or each of the first through third examples, and further includes, responsive to outputting the first GUI, orienting the first GUI based on touch inputs of the touch input signature, and responsive to outputting the second GUI, orienting the second GUI based on the touch inputs of the touch input signature.

In one embodiment, a system comprises: a touchscreen display; and a computing device operably coupled to the touchscreen display and storing instructions in non-transitory computer memory that when executed, cause the computing device to: detect touch inputs applied to the touchscreen display; and responsive to detecting the touch inputs, output a first graphical user interface (GUI) to the touchscreen display and orient the first GUI based on an arrangement of the touch inputs. In a first example of the system, the system further comprises instructions stored in the non-transitory computer memory that when executed, cause the computing device to: determine a location of the touch inputs along the touchscreen display; and responsive to the location of the touch inputs being within a first section of the touchscreen display, maintaining the output of the first GUI to the touchscreen display; and responsive to the location of the touch inputs being outside of the first section of the touchscreen display, transitioning from outputting the first GUI to the touchscreen display to outputting a second GUI to the touchscreen display. A second example of the system optionally includes the first example, and further includes instructions stored in the non-transitory computer memory that when executed, cause the computing device to: remove the first GUI from the touchscreen display and orient the second GUI based on the arrangement of the touch inputs during the transition from outputting the first GUI to the touchscreen display to outputting the second GUI to the touchscreen display.

In another embodiment, a method comprises: detecting one or more touch inputs to a touchscreen display; determining a center of a spin wheel widget to be displayed by the touchscreen display based on the one or more touch inputs; determining a number of detents and a radius of the spin wheel widget; and displaying spin wheel widget via the touchscreen display based on the center, the number of detents, and the radius. In a first example of the method, the method further comprises adjusting a selected detent of the spin wheel widget based on a noise margin. A second example of the method optionally includes the first example, and further includes adjusting a selected detent of the spin wheel widget via a user input, and responsive to adjusting the selected detent, providing a haptic feedback via the touchscreen display. A third example of the method optionally includes one or more or each of the first through third examples, and further includes adjusting a selected detent of the spin wheel widget via a user input, and responsive to adjusting the selected detent, updating one or more parameters of the spin wheel widget. A fourth example of the method optionally includes one or more or each of the first through third examples, and further includes: measuring a duration between touch inputs applied to the touchscreen display; and responsive to the duration exceeding a threshold duration, auto-hiding the spin wheel widget. A fifth example of the method optionally includes one or more or each of the first through fourth examples, and further includes displaying a second spin wheel widget via the touchscreen display based on one or more touch inputs applied to the touchscreen display at a location offset from the center by more than a threshold amount.

The disclosure also provides support for a system, comprising: a touchscreen display, and a computing device operably coupled to the touchscreen display and storing instructions in non-transitory computer memory that when executed, cause the computing device to: detect touch inputs applied to the touchscreen display, and responsive to detecting the touch inputs, output a graphical user interface (GUI) to the touchscreen display and orient the GUI based on an arrangement of the touch inputs. In a first example of the system, the GUI is a spin wheel widget including a plurality of detents. In a second example of the system, optionally including the first example, the spin wheel widget is centered based on a location of the touch inputs, and an arrangement and/or number of detents of the plurality of detents is based on a location of the touch inputs along the touchscreen display. In a third example of the system, optionally including one or both of the first and second examples, a reference detent of the plurality of detents is oriented based on the arrangement of the touch inputs, and each detent of the plurality of detents is oriented around a center of the spin wheel widget based on the orientation of the reference detent. In a fourth example of the system, optionally including one or more or each of the first through third examples, the system further comprises: instructions stored in the non-transitory computer memory that when executed, cause the computing device to: generate a plurality of selection margins including a respective selection margin for each detent of the plurality of detents, where applying a touch input to a portion of the touchscreen display defined by a selection margin of the plurality of selection margins selects a corresponding detent of the plurality of detents. In a fifth example of the system, optionally including one or more or each of the first through fourth examples, the system further comprises: instructions stored in the non-transitory computer memory that when executed, cause the computing device to: determine a source of the touch inputs applied to the touchscreen display based on the arrangement of the touch inputs, and configure a parameter of the GUI based on the source of the touch inputs. In a sixth example of the system, optionally including one or more or each of the first through fifth examples, the parameter includes a diameter of the GUI, a number of detents of the GUI, or a rotational position of a reference detent of the GUI. In a seventh example of the system, optionally including one or more or each of the first through sixth examples, outputting the GUI to the touchscreen display includes displaying a plurality of detents centered annularly around a location of the touch inputs. In a eighth example of the system, optionally including one or more or each of the first through seventh examples, orienting the GUI based on the arrangement of the touch inputs includes defining a reference detent from the plurality of detents based on an angle and/or length between the touch inputs and adjusting a rotational position of the plurality of detents based on the reference detent. In a ninth example of the system, optionally including one or more or each of the first through eighth examples, the system further comprises: instructions stored in the non-transitory computer memory that when executed, cause the computing device to: set the reference detent as a selected detent responsive to defining the reference detent, and adjust the selected detent from the reference detent to an adjacent detent of the plurality of detents. In a tenth example of the system, optionally including one or more or each of the first through ninth examples, the system further comprises: instructions stored in the non-transitory computer memory that when executed, cause the computing device to: provide haptic feedback via the touchscreen display at the location of the reference detent and/or adjacent detent responsive to adjusting the selected detent from the reference detent to the adjacent detent of the plurality of detents. In a eleventh example of the system, optionally including one or more or each of the first through tenth examples, the system further comprises: instructions stored in the non-transitory computer memory that when executed, cause the computing device to: hide the GUI responsive to a duration without a touch input applied to the touchscreen display being greater than a threshold duration.

The disclosure also provides support for a system, comprising: a touchscreen display, and a computing device operably coupled to the touchscreen display and storing instructions in non-transitory computer memory that when executed, cause the computing device to: determine a location of a touch input signature applied along a touch-sensitive surface of the touchscreen display, and responsive to determining the location of the touch input signature: output a first graphical user interface (GUI) to the touchscreen display at the location of the touch input signature if the touch input signature is within a first section of the touch-sensitive surface, and output a second GUI to the touchscreen display at the location of the touch input signature if the touch input signature is outside of the first section. In a first example of the system, the first GUI is a first spin wheel widget including a first plurality of detents and the second GUI is a second spin wheel widget including a second plurality of detents. In a second example of the system, optionally including the first example, the system further comprises: instructions stored in the non-transitory computer memory that when executed, cause the computing device to transition from outputting the first GUI to outputting the second GUI responsive to adjusting the location of the touch input signature from within the first section to outside of the first section, or transition from outputting the second GUI to outputting the first GUI responsive to adjusting the location of the touch input signature from outside of the first section to within the first section. In a third example of the system, optionally including one or both of the first and second examples, one of the first GUI or the second GUI includes at least one panel not included by the other of the first GUI or the second GUI. In a fourth example of the system, optionally including one or more or each of the first through third examples, the system further comprises: instructions stored in the non-transitory computer memory that when executed, cause the computing device to: orient the first GUI based on touch inputs of the touch input signature responsive to outputting the first GUI, and orient the second GUI based on the touch inputs of the touch input signature responsive to outputting the second GUI.

The disclosure also provides support for a method, comprising: detecting touch inputs applied to a touchscreen display, and responsive to detecting the touch inputs, outputting a first graphical user interface (GUI) to the touchscreen display and orienting the first GUI based on an arrangement of the touch inputs. In a first example of the method, the method further comprises: determining a location of the touch inputs along the touchscreen display, and responsive to the location of the touch inputs being within a first section of the touchscreen display, maintaining the output of the first GUI to the touchscreen display, and responsive to the location of the touch inputs being outside of the first section of the touchscreen display, transitioning from outputting the first GUI to the touchscreen display to outputting a second GUI to the touchscreen display. In a second example of the method, optionally including the first example, the method further comprises: removing the first GUI from the touchscreen display and orienting the second GUI based on the arrangement of the touch inputs during the transition from outputting the first GUI to the touchscreen display to outputting the second GUI to the touchscreen display.

FIGS. 1-2 are shown to scale, although other relative dimensions may be used, if desired.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

As used herein, an element or step recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:
1. A system, comprising:
 a touchscreen display;
 a com wheel comprising a rotary knob, a support connected to the rotary knob, a suction cup connected to an enlarged end section of the support, and a plurality of pins configured to interface with the touchscreen display, wherein the plurality of pins comprises a first pin supported on the rotary knob and configured to indicate a rotational position of the com wheel, a second pin supported on the enlarged end section of the support and configured to indicate a translational position of the com wheel, and a third pin configured to indicate an axial position of the com wheel, wherein the first pin is configured to rotate with the com wheel, and wherein the rotary knob comprises a conductive ring electrically coupled to each of the plurality of pins; and
 a computing device operably coupled to the touchscreen display and storing instructions in non-transitory computer memory that when executed, cause the computing device to:
  detect touch inputs applied to the touchscreen display;
  determine that a source of the touch inputs is either the plurality of pins of the com-wheel or a hand-based input based on a relative arrangement of the touch inputs;
  responsive to detecting the touch inputs and determining the plurality of pins of the com wheel as the source of the touch inputs, output a first graphical user interface (GUI) to the touchscreen display and orient the first GUI based on the relative arrangement of the touch inputs, wherein orienting the first GUI based on the relative arrangement of the touch inputs comprises setting a detent as a reference detent, the reference detent being positioned at a location of one of the plurality of pins of the com wheel; and
  responsive to detecting the touch inputs and determining the hand-based input as the source of the touch inputs, output a second GUI to the touchscreen display and orient the second GUI based on the hand-based input, wherein a parameter of the first GUI is different than the second GUI.

2. The system of claim 1, wherein the first GUI is a spin wheel widget including a plurality of detents, wherein the reference detent of the plurality of detents is automatically selected upon output of the first GUI.

3. The system of claim 2, wherein the spin wheel widget is centered based on a location of the touch inputs, and an arrangement and a number of detents of the plurality of detents is based on a location of the touch inputs along the touchscreen display.

4. The system of claim 2, wherein each detent of the plurality of detents is oriented around a center of the spin wheel widget based on the orientation of the reference detent.

5. The system of claim 2, further comprising instructions stored in the non-transitory computer memory that when executed, cause the computing device to:
 generate a plurality of selection margins including a respective selection margin for each detent of the plurality of detents, where applying a touch input to a portion of the touchscreen display defined by a selection margin of the plurality of selection margins selects a corresponding detent of the plurality of detents.

6. The system of claim 1, wherein the parameter includes a diameter of the first GUI and the second GUI.

7. The system of claim 1, wherein outputting the first GUI and the second GUI to the touchscreen display includes, for each of the first GUI and the second GUI, displaying a plurality of detents centered annularly around a location of the touch inputs.

8. The system of claim 7, wherein orienting the first GUI based on the arrangement of the touch inputs includes defining the reference detent from the plurality of detents based on one or both of an angle and a length between the touch inputs and adjusting a rotational position of the plurality of detents based on the reference detent.

9. The system of claim 8, further comprising instructions stored in the non-transitory computer memory that when executed, cause the computing device to:
 set the reference detent as a selected detent responsive to defining the reference detent; and
 adjust the selected detent from the reference detent to an adjacent detent of the plurality of detents.

10. The system of claim 9, further comprising instructions stored in the non-transitory computer memory that when executed, cause the computing device to:
 provide haptic feedback via the touchscreen display at the location of one or both of the reference detent and the adjacent detent responsive to adjusting the selected detent from the reference detent to the adjacent detent of the plurality of detents.

11. The system of claim 1, further comprising instructions stored in the non-transitory computer memory that when executed, cause the computing device to:
 hide the first GUI and/or the second GUI responsive to a duration without a touch input applied to the touchscreen display being greater than a threshold duration.

12. The system of claim 1, wherein the parameter includes a number of detents of the first GUI and the second GUI.

13. The system of claim 1, wherein the third pin is in face-sharing contact with the touchscreen display when the suction cup is mounted onto the touchscreen display and the rotary knob is pressed by a user, and wherein the third pin is not in face-sharing contact with the touchscreen display when the suction cup is mounted onto the touchscreen display and the rotary knob is not pressed by the user.

14. A system, comprising:
 a touchscreen display;
 a rotary com wheel configured to apply touch inputs to the touchscreen display via a plurality of pins with a pre-determined arrangement, wherein the rotary com wheel comprises a rotary knob, a support connected to the rotary knob, and a suction cup connected to an enlarged end section of the support, and further wherein the plurality of pins comprises a first pin supported on the rotary knob and configured to indicate a rotational position of the rotary com wheel, a second pin supported on the enlarged end section of the support and configured to indicate a translational position of the rotary com wheel, and a third pin configured to indicate an axial position of the rotary com wheel, wherein the first pin is configured to rotate with the rotary com wheel, and wherein the rotary knob comprises a conductive ring electrically coupled to each of the plurality of pins; and a computing device operably coupled to the touchscreen display and storing instructions in non-transitory computer memory that when executed, cause the computing device to:

determine a location of a touch input signature applied along a touch-sensitive surface of the touchscreen display by the rotary com wheel; and responsive to determining the location of the touch input signature:

output a first graphical user interface (GUI) to the touchscreen display at the location of the touch input signature if the touch input signature is within a first section of the touch-sensitive surface; and output a second GUI to the touchscreen display at the location of the touch input signature if the touch input signature is outside of the first section, wherein, responsive to adjustment of location of the touch input signature from within the first section to outside of the first section, the computing device transitions from outputting the first GUI to outputting the second GUI, wherein the first GUI has a first configuration and the second GUI has a second configuration that is different from the first configuration;

wherein the first GUI is a first spin wheel widget including a first plurality of inner sections and a plurality of outer sections arranged around the first plurality of inner sections, and the second GUI is a second spin wheel widget including a second plurality of inner sections and a panel, and wherein the second GUI does not include the plurality of outer sections and the first GUI does not include the panel.

15. The system of claim 14, further comprising instructions stored in the non-transitory computer memory that when executed, cause the computing device to transition from outputting the second GUI to outputting the first GUI responsive to adjusting the location of the touch input signature from outside of the first section to within the first section.

16. The system of claim 15, wherein the first GUI has a first radius and the second GUI has a second radius that is smaller than the first radius.

17. The system of claim 16, wherein the first and second radii are determined based on touch inputs of the touch input signature and tolerance regions of respective touch inputs.

18. The system of claim 14, wherein the plurality of outer sections form an annulus, and wherein each of the first plurality of inner sections are wedge-shaped and positioned within the annulus.

19. A method, comprising:

detecting touch inputs applied to a touchscreen display;

determining a source of the touch inputs applied to the touchscreen display based on a touch input signature of the touch inputs;

responsive to determining the source of the touch inputs as a com wheel, outputting a first graphical user interface (GUI) to the touchscreen display and orienting the first GUI based on a first touch input signature of the touch inputs, wherein the com wheel comprises a plurality of pins with a predetermined arrangement that corresponds to the first touch input signature, wherein the first GUI has a first number of inner sections centered annularly around the com wheel, wherein the com wheel comprises a rotary knob, a support connected to the rotary knob, and a suction cup connected to an enlarged end section of the support, and further wherein the plurality of pins comprises a first pin supported on the rotary knob and configured to indicate a rotational position of the com wheel, a second pin supported on the enlarged end section of the support and configured to indicate a translational position of the com wheel, and a third pin configured to indicate an axial position of the com wheel, wherein the first pin is configured to rotate with the com wheel, and wherein the rotary knob comprises a conductive ring electrically coupled to each of the plurality of pins; and responsive to determining the source of the touch inputs as hand-based, outputting a second GUI to the touchscreen display and orienting the second GUI based on a second touch input signature of the touch inputs, wherein the second touch input signature corresponds to a particular gesture of hand-based inputs, and wherein the second GUI has a second number of inner sections centered annularly around the second touch input, wherein determining the source of the touch inputs applied to the touchscreen display comprises comparing the detected touch inputs to predetermined touch input signatures, and wherein the first number of inner sections is different than the second number of inner sections.

20. The method of claim 19, further comprising:

detecting touch inputs corresponding to a first com wheel and touch inputs corresponding to a second com wheel concurrently and displaying the first GUI and a third GUI concurrently.

* * * * *